United States Patent
Marsenic et al.

(10) Patent No.: US 12,335,293 B2
(45) Date of Patent: Jun. 17, 2025

(54) CAPTURING IMPORTANCE IN A NETWORK USING GRAPH THEORY

(71) Applicant: Darktrace Holdings Limited, Cambridge (GB)

(72) Inventors: Marko Marsenic, London (GB); Carl Joseph Salji, Bedford (GB); Jake Lal, Cambridge (GB); Matthew Dunn, Ely (GB)

(73) Assignee: Darktrace Holdings Limited, Cambridge (GB)

( * ) Notice: Subject to any disclaimer, the term of this patent is extended or adjusted under 35 U.S.C. 154(b) by 94 days.

(21) Appl. No.: 17/977,621

(22) Filed: Oct. 31, 2022

(65) Prior Publication Data

US 2023/0132703 A1   May 4, 2023

Related U.S. Application Data

(60) Provisional application No. 63/396,105, filed on Aug. 8, 2022, provisional application No. 63/317,157, filed on Mar. 7, 2022, provisional application No. 63/274,376, filed on Nov. 1, 2021.

(51) Int. Cl.
*H04L 9/40* (2022.01)

(52) U.S. Cl.
CPC .................. *H04L 63/1433* (2013.01)

(58) Field of Classification Search
CPC .................................... H04L 63/1433
USPC ................................................ 726/25
See application file for complete search history.

(56) References Cited

U.S. PATENT DOCUMENTS

| | | | |
|---|---|---|---|
| 8,601,587 B1 * | 12/2013 | Powell | G06F 21/552 |
| | | | 726/25 |
| 10,268,821 B2 | 4/2019 | Stockdale | |
| 10,419,466 B2 | 9/2019 | Ferguson | |
| 10,425,429 B2 * | 9/2019 | Bassett | H04L 63/1441 |
| 10,701,093 B2 | 6/2020 | Dean | |
| 10,706,144 B1 * | 7/2020 | Moritz | G06F 21/55 |
| 11,277,432 B2 * | 3/2022 | Hassanzadeh | G06F 21/577 |
| 11,895,150 B2 * | 2/2024 | Engelberg | H04L 63/20 |
| 2014/0380485 A1 * | 12/2014 | Ayyagari | G06F 21/577 |
| | | | 726/25 |
| 2020/0244673 A1 | 7/2020 | Stockdale | |
| 2021/0273958 A1 | 9/2021 | McLean | |
| 2022/0060507 A1 * | 2/2022 | Crabtree | H04L 63/1433 |

* cited by examiner

*Primary Examiner* — Amare F Tabor
(74) *Attorney, Agent, or Firm* — Rutan and Tucker, LLP

(57) ABSTRACT

A cyber security system includes an importance node module to compute and use graphs to compute an importance of a node based on factors including a hierarchy and a job title of the user, aggregated account privileges from network domains and a level of shared resource access for the user. The graphs are supplied into an attack path modeling component to understand an importance of the network nodes and determine key pathways within the network that a cyber-attack would use, via a modeling the cyber-attack on a simulated and a virtual device version of the network. The cyber security system provides an intelligent prioritization of remediation action to a remediation suggester module to analyze results of the modeling the cyber-attack for each node and suggest how to perform intelligent prioritization of remediation action on a network node in one of a report and an autonomous remediation action.

20 Claims, 13 Drawing Sheets

CAPTURING IMPORTANCE IN A NETWORK USING GRAPH THEORY

RELATED APPLICATION

This non-provisional application claims priority to under 35 USC 119 and the benefit of U.S. provisional patent application titled "CYBER SECURITY SYSTEM," filed Mar. 7, 2022, application No. 63/317,157, as well as U.S. provisional patent application titled "SECURITY TOOLS," filed Nov. 1, 2021, application No. 63/274,376, as well as U.S. provisional patent application titled "A CYBER THREAT PROTECTION SYSTEM," filed Aug. 8, 2022, application No. 63/396,105, which are all incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Offices patent file or records, but otherwise reserves all copyright rights whatsoever.

FIELD

Embodiments of the design provided herein generally relate to a cyber security detection system. In several embodiments, the cyber security system may determine important nodes in the network and prioritize protecting such important nodes against cyber-threats.

BACKGROUND

Cyber security teams are often resource-starved in the face of growing attacks against their organizations, making it critical that the "blue team" understand and prioritize the organizations most serious vulnerabilities. That reality makes it essential to ensure maximum protection per unit cost. While "red teams" can provide insight into where effort and resource should be most immediately applied, the exercises themselves are costly, often fail to be exhaustive and are infrequently run.

SUMMARY

In an embodiment, an AI based cyber security system is disclosed. The AI based cyber security system may include an importance node module configured to compute, via a mathematical function at least one or more graphs and use the one or more graphs to compute an importance of a node in the one or more graphs based on factors that at least include a hierarchy of a user in an organization, a job title of the user in the organization, aggregated account privileges from multiple different network domains for the user, and a level of shared resource access for the user, where the one or more graphs are then supplied as input into an attack path modeling component, where network nodes in a network include both network devices as well as user accounts, and where the node includes at least one a the user and a device associated with the user, where the attack path modeling component is configured to i) understand an importance of the network nodes in the network compared to other network nodes in the network, and ii) determine key pathways within the network and vulnerable network nodes in the network that a cyber-attack would use during the cyber-attack occurrence, via a modeling the cyber-attack occurrence on at least one of 1) a simulated device version and 2) a virtual device version of the network under analysis, where the attack path modeling component is configured to understand the importance of the network nodes in the network compared to the other network nodes in the network based on the supplied input from the importance node, where the importance node module and the attack path modeling component are configured to cooperate to analyze the importance of the network nodes in the network compared to other network nodes in the network, and the key pathways within the network and the vulnerable network nodes in the network that the cyber-attack would use during the cyber-attack occurrence in order to provide an intelligent prioritization of remediation action to remediate the cyber-attack for a first network node from the network protected by a cyber security appliance, a remediation suggester module configured to cooperate with the attack path modeling component to analyze results of the modeling the cyber-attack occurrence for each node in the network and suggest how to perform the intelligent prioritization of remediation action on the first network node compared to the other network nodes in at least one of a report and an autonomous remediation action initiated by the remediation suggester to mitigate against the cyber-attack, one or more processing units configured to execute software instructions associated with the importance node module, the attack path modeling component, the cyber security appliance, and the remediation suggester module, and one or more non-transitory storage mediums configured to store at least software associated with the with the importance node module, the attack path modeling component, the cyber security appliance, and the remediation suggester module.

The AI based cyber security system may further include a graph theory module cooperating with the importance node module and configured to utilize a graph theory to derive multi-domain, risk-prioritized attack paths within the computer networks for cyber-attack path modelling throughout an entity's multiple domain network including at least cloud, IT network, and email network, in order to prioritize mitigation of a cyber-attack when the cyber security appliance takes the autonomous remediation action initiated by the remediation suggester to mitigate against the cyber-attack.

In some embodiments, the AI based cyber security system includes an artificial intelligence-based importance node module configured to model and simulate the cyber-attack occurrence, where the artificial intelligence-based importance node module is configured to determine and use a users presence (including an importance of a user) in a simulated cyber-attack analysis, where the users presence includes at least the importance of the user. The attack path modeling component and the artificial intelligence-based importance node module may use a decay algorithm to decide what nodes in the network are of most importance to detect key devices or key users. Further, the graph theory module can be configured to use an active directory that answers to what uses an unweighted directed graph.

The AI based cyber security system of can further include a reconciliatory module configured to reconcile different accounts associated with the user into one entity, where each of the different accounts is associated with a corresponding risk, where the reconciliatory module is further configured to compute a device importance based at least in part on an interactivity of the device including data received by the device and data sent from the device and a level of sensitivity of the data accessible within the device and by the device. The reconciliatory module computes an overall importance for each entity based on each of the different accounts associated with the user and each device importance of each device associated with the entity.

In some embodiments, the graph module is configured to create a second graph of the nodes that the user i) connects to, ii) move to, or iii) users device connects to. In several embodiments, upon a determination that a compromise is occurred, the attack path modelling component and the remediation suggester module are configured to suggest a preemptive intelligent prioritization of remediation action to be performed on each node on the second graph connecting to the user.

The one or more graphs can include at least a subset of a basic undirected graphs, a directed weighted graph, and an unweighted directed graphs from information pulled from the domains based on the factors that at least include the hierarchy of the user in the organization, the job title of the user in the organization, the aggregated account privileges from the multiple different network domains for the user, and the level of shared resource access for the user.

In some embodiments, a method for countering a cyber-threats disclose. The method for countering a cyber-attack can include configuring an importance node module to compute, via a mathematical function at least one or more graphs and use the one or more graphs to compute an importance of a node in the one or more graphs based on factors that at least include a hierarchy of a user in an organization, a job title of the user in the organization, aggregated account privileges from multiple different network domains for the user, and a level of shared resource access for the user, where the one or more graphs are then supplied as input into an attack path modeling component, where network nodes in a network include both network devices as well as user accounts, and where the node includes at least one a the user and a device associated with the user, configuring the attack path modeling component is to i) understand an importance of the network nodes in the network compared to other network nodes in the network, and ii) determine key pathways within the network and vulnerable network nodes in the network that a cyber-attack would use during the cyber-attack occurrence, via a modeling the cyber-attack occurrence on at least one of 1) a simulated device version and 2) a virtual device version of the network under analysis, where the attack path modeling component is configured to understand the importance of the network nodes in the network compared to the other network nodes in the network based on the supplied input from the importance node, configuring the importance node module and the attack path modeling component to cooperate to analyze the importance of the network nodes in the network compared to other network nodes in the network, and the key pathways within the network and the vulnerable network nodes in the network that the cyber-attack would use during the cyber-attack occurrence in order to provide an intelligent prioritization of remediation action to remediate the cyber-attack for a first network node from the network protected by a cyber security appliance, configuring a remediation suggester module to cooperate with the attack path modeling component to analyze results of the modeling the cyber-attack occurrence for each node in the network and suggest how to perform the intelligent prioritization of remediation action on the first network node compared to the other network nodes in at least one of a report and an autonomous remediation action initiated by the remediation suggester to mitigate against the cyber-attack, configuring one or more processing units to execute software instructions associated with the importance node module, the attack path modeling component, the cyber security appliance, and the remediation suggester module, and configuring one or more non-transitory storage mediums to store at least software associated with the with the importance node module, the attack path modeling component, the cyber security appliance, and the remediation suggester module.

In an embodiment, the method for countering a cyber-threat further includes configuring a graph theory module cooperating with the importance node module to utilize a graph theory to derive multi-domain, risk-prioritized attack paths within the computer networks for cyber-attack path modelling throughout an entity's multiple domain network including at least cloud, IT network, and email network, in order to prioritize mitigation of a cyber-attack when the cyber security appliance takes the autonomous remediation action initiated by the remediation suggester to mitigate against the cyber-attack.

The method for countering a cyber-threat can further include configuring an artificial intelligence-based importance node module configured to model and simulate the cyber-attack occurrence, where the artificial intelligence-based importance node module is configured to determine and use a users presence (including an importance of a user) in a simulated cyber-attack analysis, where the users presence includes at least the importance of the user. The attack path modeling component and the artificial intelligence-based importance node module can use a decay algorithm to decide what nodes in the network are of most importance to detect key devices or key users.

The method for countering a cyber-threat can further include configuring the graph theory module to use an active directory that answers to what uses an unweighted directed graph. The method for countering a cyber-threat can include configuring a reconciliatory module configured to reconcile different accounts associated with the user into one entity, where each of the different accounts is associated with a corresponding risk, where the reconciliatory module is further configured to compute a device importance based at least in part on an interactivity of the device including data received by the device and data sent from the device and a level of sensitivity of the data accessible within the device and by the device.

The method for countering a cyber-threat can include configuring the the graph module to create a second graph of the nodes that the user i) connects to, ii) move to, or iii) users device connects to. The method for countering a cyber-threat can further include configuring the attack path modelling component and the remediation suggester module to suggest a preemptive intelligent prioritization of remediation action to be performed on each node on the second graph connecting to the user, upon a determination that a compromise is occurred.

In some embodiments, the one or more graphs can include at least a subset of a basic undirected graphs, a directed weighted graph, and an unweighted directed graphs from information pulled from the domains based on the factors that at least include the hierarchy of the user in the organization, the job title of the user in the organization, the aggregated account privileges from the multiple different network domains for the user, and the level of shared resource access for the user.

In some embodiments, a non-transitory computer readable medium in an AI based cyber security system is disclosed. The non-transitory computer readable medium can include one or more computer readable codes operable, when executed by one or more processors, to instruct an importance node module configured to reside on the AI based cyber security system to perform the method for countering a cyber-threat.

These and other features of the design provided herein may be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1:
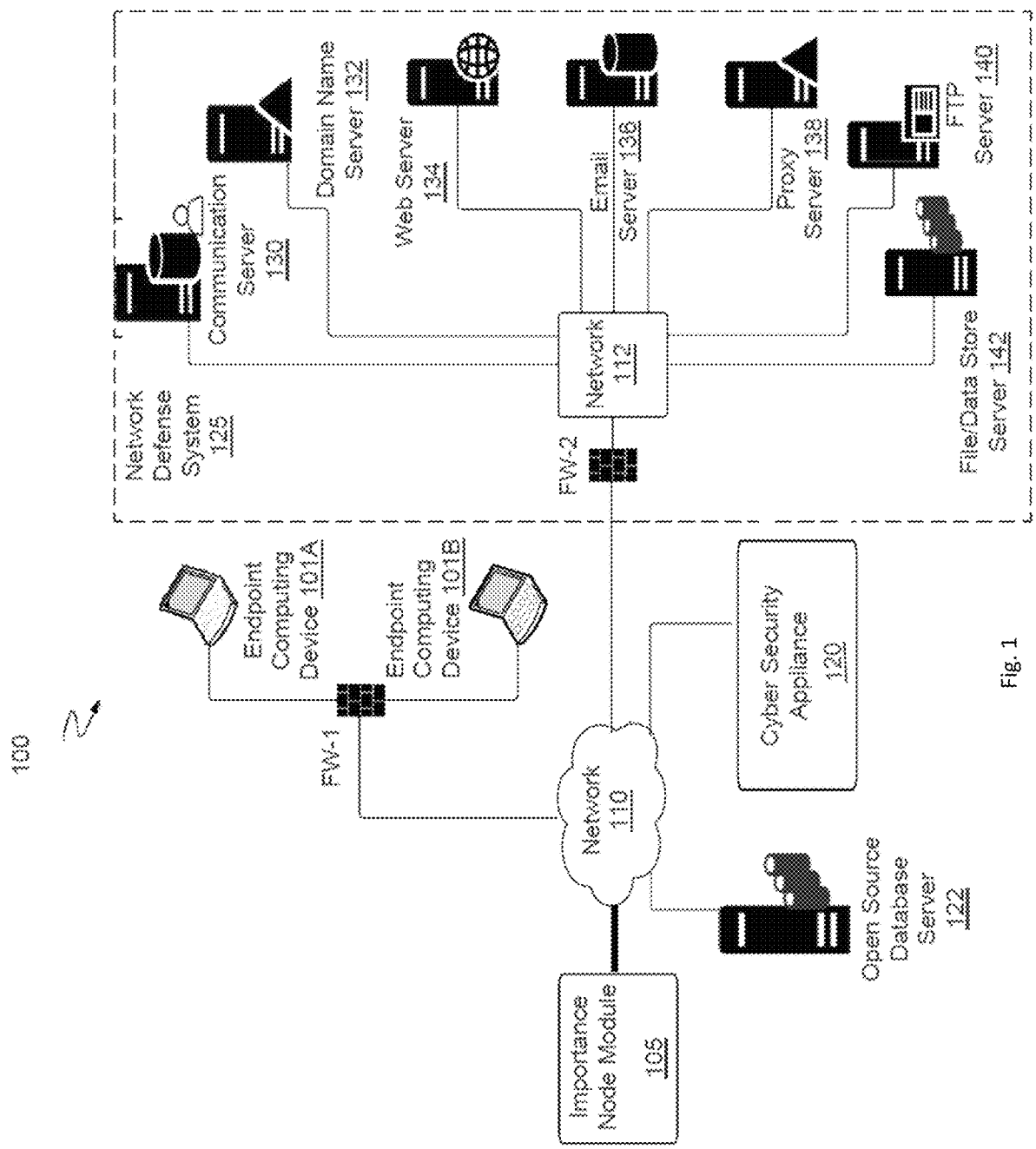
FIG. 1 illustrates a block diagram of an AI based cyber security system having a set of modules configured to cooperate with a cyber security appliance to predict an autonomous response to a detected cyber incident, in accordance with an embodiment of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

In an already under-resourced cyber security industry, demand for talent is currently much greater than supply. While under-staffed and under-resourced blue teams try to defend increasingly large networks, the red teams that might have the insight to direct the resource allocation are infrequently used because red team exercises are expensive and non-exhaustive. The result is the blue team that becomes decreasingly effective over time but periodically (and non-exhaustively) corrected by expensive insights from external red teams.

One way to overcome these problems is to model attack paths in real-time. That way, blue teams would have continual insight and may continuously adapt their approach to defending the most critical network assets without the need for expensive external input. In short, the solution is to automate an internal red team. Disclosed methods construct two weighted graphs to show pair-wise relations between network entities that might be compromised, such as devices and user accounts.

A first graph is drawn with directed edge weights representing the estimated probability of rapid lateral movement from the source to the destination entity. For example, if a device has well-established communication pathways to a server with a high CVSS score, then the edge weight will be closer to one. Edges also consider intrinsic mechanisms that enhance security, such as multi-factor authentication, end-point-protection agents, or even just a more security-aware user. It should be noted that, the first graph and the second graph can be merged together to generate a graph. Throughout the present disclosure, the terms "graph", "first graph", second graph", "graphs" and "one or more graphs" are used interchangeably.

Then, to form the second graph, objective importance scores are either manually or automatically seeded and propagated through the graph via edges weighted according to shared access or trust relationships. For example, if the CEO of an organization has access to a file shared with only one other employee—some of the importance associated with the CEO is propagated to this other user. If the CEO has access to a file that many other users can access, the importance of the CEO is diluted amongst the many users, suggesting that this file is not especially important. When available, the second graph also includes email communication patterns.

Both graphs can be used to simulate the compromise of all potential network entry points—including any human with access to the internet, as well as externally-facing infrastructure. The simulation can yield impact scores that correlate to path lengths to high-importance nodes. The scores can be modulated according to how exposed an entry point is to an outsider. This results in a dynamic list of network nodes, ordered by the potential damage to the organization if compromised at the current time. The paths to these nodes can also be highlighted, allowing the blue team to remediate accordingly. Compared to traditional red team exercises, this method is continuous, rigorous, and cost-effective.

Accordingly, various embodiments disclose cooperation of different defense systems, including a set of modules to help an autonomous response module to take suitable defensive actions in case of cyber incidents. In some embodiments, occurrence of one or more events can trigger off the set of modules' investigation. While separate events can trigger the set of modules, a single incident can also trigger set of modules. In response, the set of modules can activate an autonomous response action against the event(s).

As discussed in more detail below, the analyzer module can cooperate with the one or more unsupervised machine learning models trained on the normal pattern of life in order to perform anomaly detection against the actual normal pattern of life for that system to determine whether an anomaly (e.g., the identified abnormal behavior and/or suspicious activity) is malicious or benign. In operation of the cyber security appliance 120, the potential cyber threat can be previously unknown but shares enough (or does not share enough) in common with the traits from the AI models trained on cyber threats to now be identified as malicious or benign. Note, if later confirmed as malicious, then the AI models trained with machine learning on possible cyber threats can update their training. Likewise, as the cyber security appliance 120 continues to operate, then the one or more machine learning models trained on a normal pattern of life for each of the entities in the system can be updated and trained with unsupervised machine learning algorithms. The analyzer module can use any number of data analysis processes (discussed more in detail below and including the agent analyzer data analysis process here) to help obtain system data points so that this data can be fed and compared to the one or more machine learning models trained on a normal pattern of life, as well as the one or more machine learning models trained on potential cyber threats, as well as create and store data points with the connection finger prints.

All of the above AI models can continually learn and train with unsupervised machine learning algorithms on an ongoing basis when deployed in their system that the cyber security appliance 120 is protecting. Thus, learning and training on what is normal behavior for each user, each device, and the system overall and lowering a threshold of what is an anomaly.

Next, during deployment the analyzer module uses data analysis processes and cooperates with AI models trained on forming and investigating hypotheses on what are a possible set of cyber threats.

Similarly, during deployment, the data analysis processes (discussed herein) used by the analyzer module can use unsupervised machine learning to update the initial training learned during pre-deployment, and then update the training with unsupervised learning algorithms during the cyber security appliance 120's deployment in the system being protected when various different steps to either i) support or ii) refute the possible set of cyber threats hypotheses worked better or worked worse.

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are numerous of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, The self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given features values are non-anomalous, otherwise its anomalous. Note, this anomaly detection can determine that a data point is anomalous/non-anomalous on the basis of a particular feature. In reality, the cyber security should not flag a data point as an anomaly based on a single feature. Merely, when a combination of all the probability values for all features for a given data point is calculated can the modules cooperating with the AI model of normal behavior can say with high confidence whether a data point is an anomaly or not.

Again, the AI models trained on a normal behavior of entities in a domain under analysis may perform the threat detection through a probabilistic change in a normal behavior through the application of, for example, an unsupervised Bayesian mathematical model to detect behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its' entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its' entirety. In addition, please reference US patent publication number "US2020244673A1, filed Apr. 23, 2019, titled "Multivariate network structure anomaly detector," which is incorporated by reference in its' entirety, for another example anomalous behavior detector with a Multivariate Network and Artificial Intelligence classifiers.

FIG. 1 illustrates a block diagram of an AI based cyber security system having a set of modules configured to cooperate with a cyber security appliance to counter a detected cyber-threat, in accordance with an embodiment of the disclosure. As shown, the AI based cyber security system 100 having a importance node module 105 which is communicatively coupled to a cyber security appliance 120, an open source (OS) database server 122, one or more endpoint computing devices 101A-B, and a network defense system 125 with one or more entities 130-142, over one or more networks 110/112, is shown, in accordance with an embodiment of the disclosure. As described above, the AI based cyber security system 100 may cooperate with the importance node module 105 to counter an actual cyber-attack on a network including physical devices being protected by the set of modules and artificial intelligence models configured to detect the cyber-threat.

The AI models trained on a normal behavior of entities in a domain under analysis may perform the threat detection through a probabilistic change in a normal behavior through the application of, for example, an unsupervised Bayesian mathematical model to detect behavioral change through other forms of anomaly detection such as an amount of standard deviations away from a Gaussian Probability Distribution where most of the data points are spread around a central (mean) location.

Clustering is also an important concept when it comes to unsupervised learning. Clustering mainly deals with finding a structure or pattern in a collection of uncategorized data. Unsupervised Learning Clustering algorithms used process the data and find natural clusters(groups) if they exist in the data. Clustering allows you to adjust the amount of groups/categories as well as the granularity of these groups. Clustering algorithms that can be implemented include Hierarchical clustering, K-means clustering, K-NN (k nearest neighbors), Principal Component Analysis, Singular Value Decomposition, Independent Component Analysis. Note, AI classifiers can utilize clustering to split the dataset into groups based on their similarities.

Figure 2:
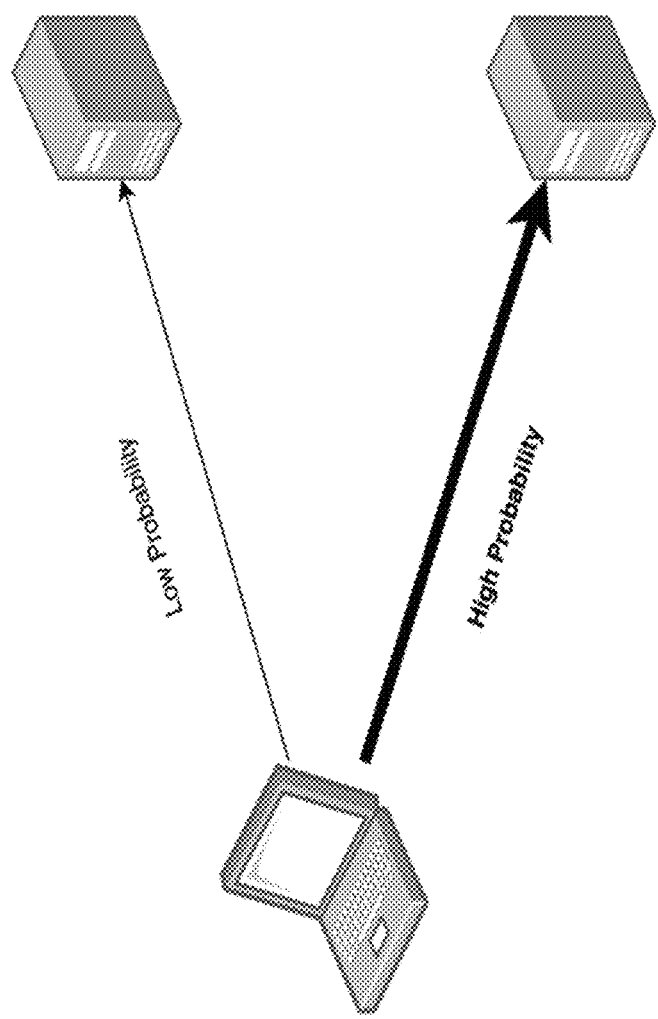
FIG. 2 illustrates a block diagram of various datasets of an AI based cyber security system having a set of modules configured to cooperate with a cyber security appliance to predict an autonomous response to a detected cyber incident, in accordance with an embodiment of the disclosure.
Figure 3:
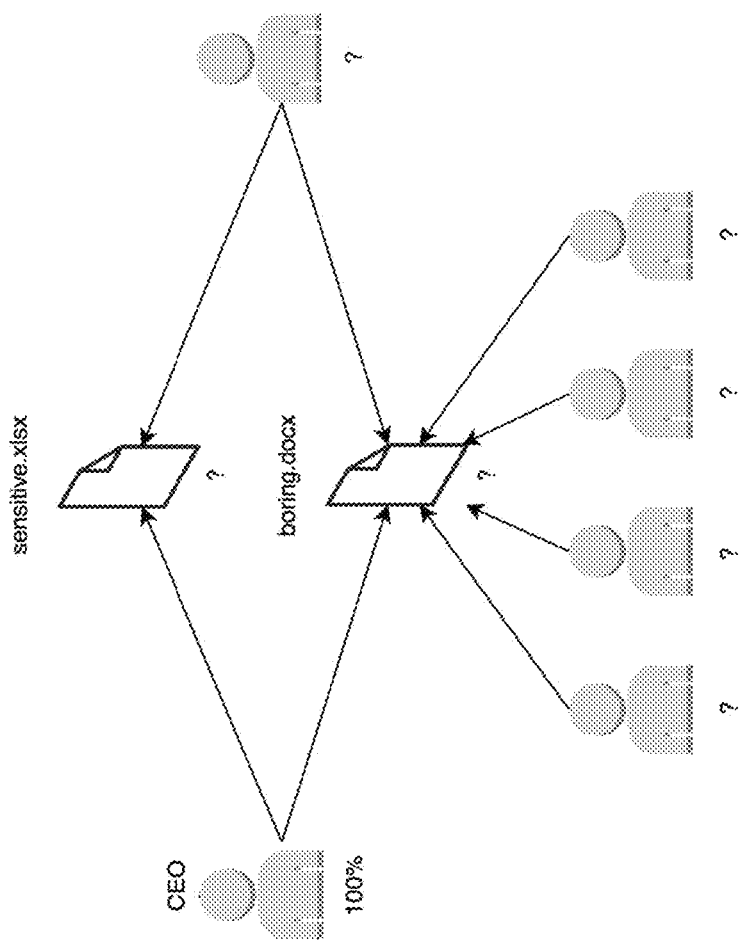
FIG. 3 illustrates a block diagram of an autonomous response action taken by the importance node module of an AI based cyber security system having a set of modules configured to cooperate with a cyber security appliance to predict an autonomous response to a detected cyber incident, in accordance with an embodiment of the disclosure.
Figure 4:
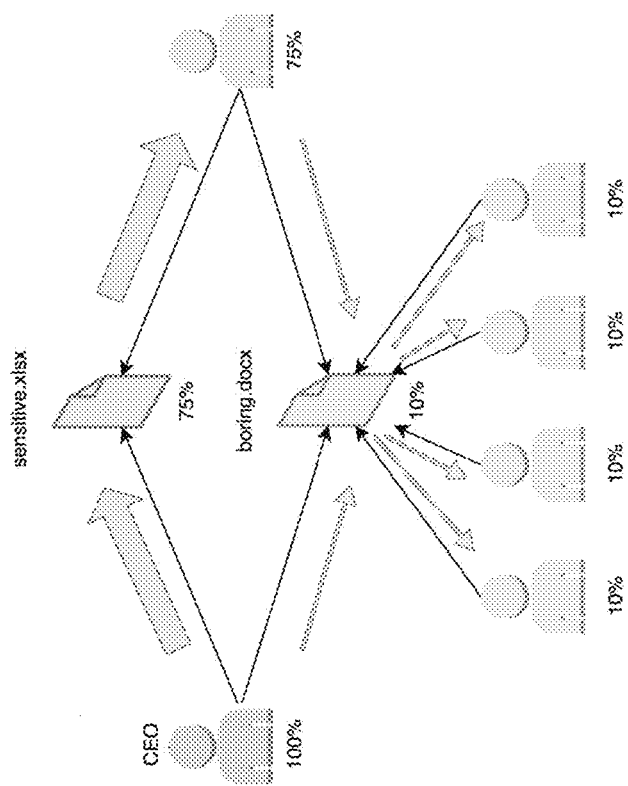
FIG. 4 illustrates a block diagram of an AI based cyber security system having a set of modules configured to cooperate with a cyber security appliance to predict an autonomous response to a detected cyber incident and its performance once the AI based cyber security system takes an autonomous response action visible to the attacker, in accordance with an embodiment of the disclosure.
Figure 5:
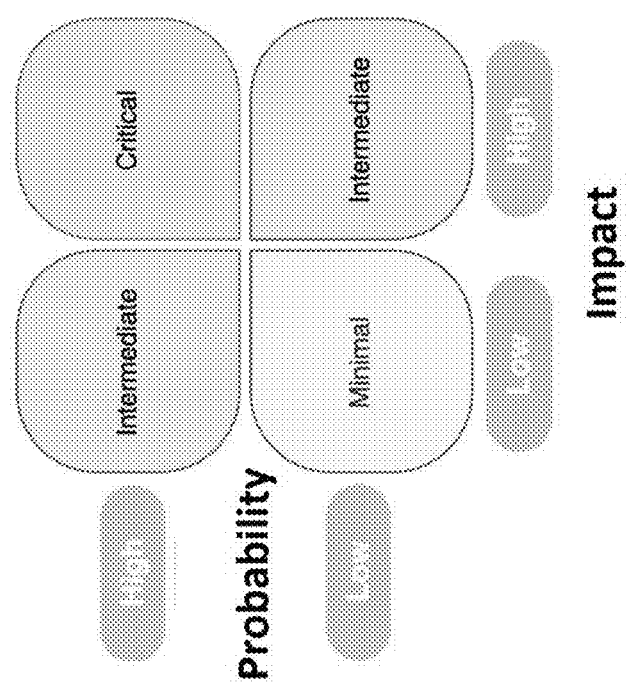
FIG. 5 illustrates a block diagram of the interactions between the importance node module and the set of modules and artificial intelligence models of an AI based cyber security system having a set of modules configured to cooperate with a cyber security appliance to predict an autonomous response to a detected cyber incident, in accordance with an embodiment of the disclosure.
Figure 6:
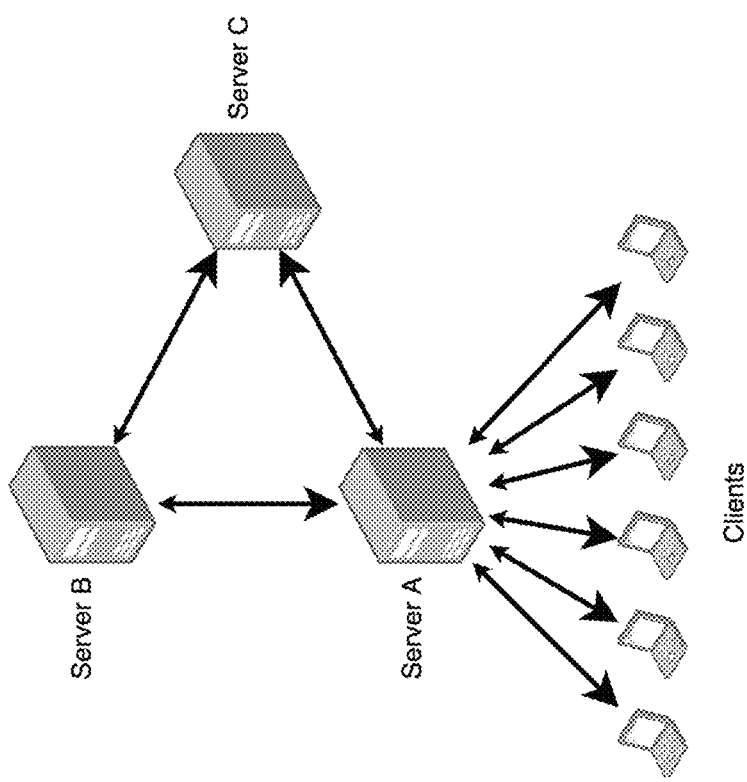
FIG. 6 illustrates a block diagram of a feedback loop between the set of modules and the artificial intelligence models and the importance node module of an AI based cyber security system having a set of modules configured to cooperate with a cyber security appliance to predict an autonomous response to a detected cyber incident, in accordance with an embodiment of the disclosure.
Figure 7:
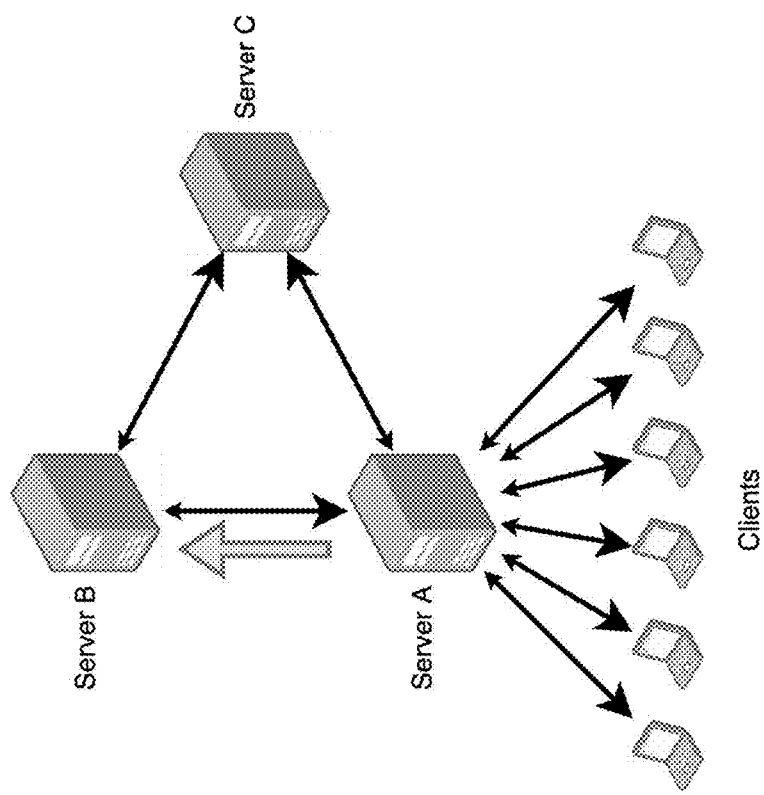
FIG. 7 illustrates an overview of various aspects of an AI based cyber security system having a set of modules configured to cooperate with a cyber security appliance to predict an autonomous response to a detected cyber incident, in accordance with an embodiment of the disclosure.

FIGS. 2-7 illustrate various aspects and components of the present disclosure. In particular, FIG. 2 illustrates a visual representation of risk matrix, in accordance with an embodiment of the disclosure. FIG. 3 illustrates basic principles associated with lateral movement probability estimation, in accordance with an embodiment of the disclosure. FIG. 4 illustrates a visual representation of impact score pre-propagation, in accordance with an embodiment of the disclosure. FIG. 5 illustrates visual representation of impact score post-propagation, in accordance with an embodiment of the disclosure. FIG. 6 illustrates a key server identification from network traffic patterns, in accordance with an embodiment of the disclosure. FIG. 7 illustrates a key server identification and an impact propagation via network patterns, in accordance with some embodiments of the disclosure. The description that follows can be understood best with reference with FIGS. 2-7.

Several embodiments of the present disclosure are directed to computational approaches to determine the importance of individual users and devices in a business entity and across the entity's multiple domain network including Cloud, IT Network, email network (e.g. many different services and platforms). Such computational approaches can use a number of different technologies, including graph theory to try to reconcile all of different data sources, different platforms, different services and user and device presence on all of those different environments. The AI based cyber security system then can aggregate those into entities, and estimate the importance of those nodes or entities or individuals based upon all of this data that are aggregated, and analyze the data to identify an explicit importance, such as job, title, and role in the organization and an implicit importance based on some more nuanced factors that allow the AI based cyber security system to feed that into an attack path modeling component to determine a risk as well as mitigation approaches to display to the user.

In general, the embodiments described herein include an artificial intelligence based cyber security system and method for countering a cyber-threat, which are used to protect an organization such as a company, a client, etc., and all of the entities of the organization (e.g., such entities may be any email and network devices, endpoint devices, network servers and databased, network addresses, user agents, domain addresses, file directories, communication ports, analysts, end users, etc.).

Typically, cyber security teams are resource-starved in the face of growing attacks against their organizations which makes it critical that the blue team understands and prioritizes the organizations most serious vulnerabilities. That reality makes it essential to ensure maximum protection per unit cost. While red teams can provide insight into where effort and resource should be most immediately applied, the exercises themselves are costly, often fail to be exhaustive and are infrequently run.

In various embodiments of the present disclosure, an algorithmic approach is used to decide what nodes in a network are of most importance. This approach can further be utilized to detect key devices or key individuals based on using a decay algorithm. In some embodiments, based on user-provided vulnerability scan results, and passive analysis of traffic, the AI based cyber security system can build a graph of entities in a digital estate, along with the possible pathways of compromise between them. In additional embodiments, users can also seed the graph with the most institutionally important entities (e.g., those relating to high level managers, CTOs, COOs, etc.). Subsequently, an importance score can be computed for each node in the graph. The score can be computed using the following decay equation:

$$x_i = (x_{i-1} + c)^{\frac{1}{d}}$$

The algorithm for propagation can use deques in order to maintain a time complexity. X is the score and i is the associated entity ID. The series of IDs can be generated by calculating all paths from the current node. If an ID has a score associated with it, then the score is propagated with the decay equation applied. In the above equation, c and d are constants that can be scaled depending on network types.

In some embodiments, a measure of graph centrality, which is calculated by summing the number of times an ID appears as a target from a list of edges, may also be used to determine an additional "keyness" score, to identify nodes that are most important to the network, such as those associated with critical servers and system admins. These metrics can then be combined with pathfinding algorithms to determine the path from the most vulnerable entry points to the network (e.g., nodes associated with externally facing servers, or human users), to the most important or most key nodes, establishing the paths of greatest possible vulnerability to the organization.

Referring back to FIG. 1, now, when modeling and simulating with the importance node module 105, the importance node module 105 may use an importance of a user and their corresponding device(s) in a hypothetical simulation based on the detected incident. The importance node module 105 may use an importance of a user and their corresponding device(s) in a simulated attack analysis when modeling and simulating the attack. The users importance may be conveyed by the set of modules and the artificial intelligence models into the attack importance node module 105 in a number of ways, as described in details below.

The users importance can be manually put in by a user of the importance node module 105. The user can enter manually the title and importance of, for example, officers of the company and employees with high levels of administrative rights. The users importance can also be obtained by a visual scan of an organization chart supplied by a user of the importance node module 105. A user importance metric for the attack path modelling can come from natural language processing. The importance of the user may be inputted by other techniques as well. Attack path modelling may require a concept of impact and of probability. Probability can be based on, for example, how frequently something is interacted with and how many clients it has connections to. In some embodiments, an impact score can be factored for the risk calculation related to impact and how important a user is. In contrast to the lateral movement probability, which is an edge property, impact is an intrinsic node property.

Conceptually, this impact score should be representative of the resulting negative impact to the organization in the event that the node is compromised.

In an embodiment, the importance of the user such as a job title can be factored based on a known or deduced hierarchy. The importance node module 105 can use job title information derived from/pulled in from a premise active directory, title based site such as LinkedIn, and a service such as AD servers, pulled in information from service providers external IDaaS services like Okta, Duo, Jumpcloud, to derive level of "keyness," deduced by an AI classifier trained on job titles, etc. Natural language processing can be used to derive a seniority level and department from the job title text. This is combined with user hierarchy where derivable (for example, Microsoft Azure AD org chart feature). A list of predefined "key" job titles can also be used. This data is seeded into the importance node module 105 data to raise the importance of SaaS users and their associated devices when performing virtual attack scenarios (i.e., running a hypothetical simulation). This is then compared to intelligence learning on organizational structures and their hierarchy titles. The importance node module 105 can also perform analysis on the source material with natural language process to derive the organizational hierarchy. The importance node module 105 can apply image analysis in case the source material contains visual aspects such as an organizational chart system. For example, in Microsoft teams the importance node module 105 can see an organizational chart and then derive the hierarchy and associate terms/titles with positional ranks within that hierarchy. It should be noted that, the importance node module 105 can also use human language translator if the source of the information is provided in a different human language than the human language that the natural language engine was trained in. Devices associated with users whose title and/or position in the hierarchy of an organization can be given a higher risk metric if that device was compromised. These devices will show up as nodes will a higher importance/a key node in a graph used in, for example, the importance node module 105.

As noted before, the importance node module 105 can build a graph of nodes including who is a key user and what routes/attack paths needed to travel to the nodes. The importance node module 105 can decide the impact level for node in the context of virtual attack simulations. The importance node module 105 can feed information it determines back to the set of modules. Thus, the importance node module 105 can identify individuals with more importance than others if compromised by a cyber incident and/or certain users to alter the autonomous response actions to take/restrict and mitigate when a cyber incident is detected against that node. In some embodiments, the simulator can perform one or more simulations and determine the actual effect of the altered autonomous response taken compared to other responses that could be taken. The importance node module 105 can identify individuals with more importance than others and thus their corresponding devices, as well as key servers to protect the network.

The importance node module 105 can compute an importance of each user from simple information pulled from multiple domains on multiple factors such as user importance based on hierarchy/job title in the organization (including active directory and third-party services and similar kind of id provider services). The importance node module 105 can further retrieve publicly available information from open-source information and websites, such as Linked-In profiles of employees of the company, to understand implicit hierarchy and aggregated account privileges for the same person with possibly different user names across the multiple domains, including SaaS account privileges, Network Privileges, Cloud, connectivity of the user to other users, and accessibility to sensitive documents and/or key devices within the network.

The importance node module 105 can look at the outputs of the hypothetical simulations and decide how to respond to the cyber-incident. The importance node module can further query the set of modules and the artificial intelligence models for more information such as the already-compromised devices in order to calculate the risk score for each device and determine the suitable action in response to the cyber incident. Any new information gathered based on the hypothetical simulations can be used by the importance node module 105 to update artificial intelligence models by updating their respective weights. The updated (i.e., trained) artificial intelligence models will be able to take preemptive actions against similar cyber incidents in the future.

In some embodiments, the cyber security appliance can identify identities within the cybersecurity software by matching SaaS Accounts, Emails, AD Accounts and network devices that are used by the same person. The cyber security appliance can identify identities for SaaS devices and users across different services via aggregation through fuzzy matching and more complex machine learning-based methods. Similarly, network devices may be linked to SaaS services using aggregation data such as that acquired from Lightweight Directory Access Protocol (LDAP, AD Servers) enrichment, from external services such as Microsoft Defender, or from credentials observed by our own endpoint agents. The aggregation for different services can also help identify others. For example, email times can be used to match to network traffic times for confidence.

Further, linked devices can be turned into "meta" device entities. The meta device entity can be a representation of a user which can be used to influence how the meta entity is treated in terms of modeling. Information known about composite parts of the entity (e.g., their network device) can be used to contribute to scoring about their importance to the organization, their "weakness", and to tailor synthetic campaigns towards them.

In an example, if a meta-device entity for firstname.lastname@example.com email address is associated with a windows device, then tailored phishing using windows updates alerts can be used. In another example, if a meta-device entity for firstname.lastname@example.com contains an AWS account, but others do not, it can be deduced they have access to a cloud environment which boosts their importance.

In several embodiments, the user presence across many different facets of business operations (e.g., network device, corporate phone, SaaS services, email, etc.) can be aggregated to overall impact their "targetability" in the context of attack path modeling. Node exposure, node weakness, "damage" scores can all be impacted by presence on these different services, which can be added together to assign these scores to a meta-device which represents a person in a business.

The aggregation of user presence can improve the ability to replicate a logical and reasonable attack path and can improve prevent capabilities by unifying all of the routes of the user presence (e.g., a network device, a phone, etc.) compared to considering the users devices separately. In various embodiments, the AI based cyber security system can include a simulator to simulate the propagation ways and the effect of actual cyber-threats as well as potential cyber-threats. The simulator may use the importance of the user and their corresponding device(s) in a simulated attack analysis when modeling and simulating the cyber-threat. The users importance may be conveyed into the attack simulator in a number of ways. In some embodiments, the users importance can be manually put in by a user of the simulator. The user can enter manually the title and importance of, for example, officers of the company and employees with high levels of administrative rights. In an embodiment, the users importance can be obtained by a visual scan of an organization chart supplied by a user of the attack simulator. In additional embodiments, a user importance metric for the attack path modelling can come from natural language processing. Additionally or in the alternative, the importance of the user may be inputted by other techniques as well.

The importance of the user such as a job title can factored based on a known or deduced hierarchy. The AI simulator can use job title information derived from/pulled in from a premise active directory, title based site such as LinkedIn, an ad service such as AD servers, pulled in information from service providers external IDaaS services like Okta, Duo, Jumpcloud, to derive level of "keyness," deduced by an AI classifier trained on job titles, etc. Natural language processing can be used to derive a seniority level and department from the job title text. This is combined with user hierarchy where derivable (for example, Microsoft Azure AD org chart feature). A list of predefined "key" job titles can also be used.

In performing the simulations, the simulator can build a graph of nodes including who is a key user and what routes/attack paths needed to travel to the nodes. The simulator can decide the impact level for node in the context of virtual attack simulations. The simulator can feed information it determines back to the autonomous response module, as well as other parts of the product suite. Thus, the simulator can identify individuals with more importance than others if compromised by a cyber-attack and/or certain users to alter the autonomous response actions to take/restrict and mitigate when a cyber-attack is detected against that node. Then, a run a simulation and determine the actual effect of the altered autonomous response taken compared to other responses that could be taken. The simulator can identify individuals with more importance than others and thus their corresponding devices; as well as key servers to protect the network.

The AI based cyber security system can use resource impact propagation, which can include a way to determine an ease of compromising a user through a poison file attack. The AI based cyber security system can detect files that would be good candidates for compromising a user and also traverse all paths that the system wouldn't get through network traffic analysis. The AI based cyber security system can factor how important nodes are based on what is discussed in where users and their devices are ranked based on their importance in the organization. Resources (on premises via SMB, through SaaS logs, etc.) observed in user activity are recorded. Resources can be ranked for their impact and ability to propagate. Resources with more than one user interacting, or users interacting who have a high impact score as derived based on user importance, can be considered high impact—either because they are gateways to key individuals/important people, amount of interactions with that file/document, content analysis of that file/document, a file location of where the file is found—finance folder and a finance file, and/or can be a gateway used for lateral movement. "Impact" can also be derived by natural language processing analysis of the filename and file path This impact propagation mechanism relies on the assumption of resource access segmentation assignment according to resource and/or user impact. The use of a poisoned resource (on prem or in a SaaS context) should also be covered here. The risk from replacing this resource is high.

Once the importance node module 105 computes, via a mathematical function, the graphs, the importance node module 105 can use the graphs to compute an importance of a node in the graphs based on one or more factors. The importance node model 105 can use factors such as a hierarchy of the user in the organization, the job title of the user in the organization, aggregated account privileges from multiple different network domains for the user, and the level of shared resource access for the user. The graphs can then be supplied as input into an attack path modeling component. The network nodes in a network can include both network devices as well as user accounts, and each node can include at least one the user and a device associated with the user. The graphs can include at least a subset of a basic undirected graphs, a directed weighted graph, and an unweighted directed graphs from information pulled from the domains based on the factors that at least include the hierarchy of the user in the organization, the job title of the user in the organization, the aggregated account privileges from the multiple different network domains for the user, and the level of shared resource access for the user.

The attack path modeling component can be programmed to work out the key paths and devices in a network via running cyber-attacks on a simulated or virtual device version of the network under analysis incorporating metrics that feed into that modeling. The attack modeling has been programmed with the knowledge of a layout and connection pattern of each particular network device in a network and an amount of connections and/or hops to other network devices in the network. Also, how important a particular device (a key importance) can be determined by the function of that network device, the user(s) associated with that network device, the location of the device within the network and an amount of connections and/or hops to other important devices in the network. The attack path modeling component ingests the information for the purposes of modeling and simulating a potential attack against the network and routes that an attacker would take through the network. The attack path modeling component can be constructed with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the network under analysis.

The attack path modelling component can offer a real-time, automated, dual-aspect, multi-data-source, end-to-end capability for attack path modelling. The attack path modelling component can be designed to give remediation suggester module a comprehensive view of realistic, risk-prioritized attack paths so that resources can be best allocated to defend key assets. As a proactive risk-reducing approach, such disclosed methods and systems can build on self-learning AI models to produce continuously updated data for all assets across the entire digital domain. To that end, one or more graphs can be generated based on the users, accounts, devices and activities within the network of the organization.

The attack path modeling component can understand the importance of the network nodes in the network compared to the other network nodes in the network based on the supplied input from the importance node. The importance node module and the attack path modeling component can cooperate to analyze the importance of the network nodes in the network compared to other network nodes in the network, and the key pathways within the network and the vulnerable network nodes in the network that the cyber-attack would use during the cyber-attack occurrence in order to provide an intelligent prioritization of remediation action to remediate the cyber-attack for a first network node from the network protected by a cyber security appliance.

A remediation suggester module can cooperate with the attack path modeling component to analyze results of the modeling the cyber-attack occurrence for each node in the network and suggest how to perform the intelligent prioritization of remediation action on the first network node compared to the other network nodes in at least one of a report and an autonomous remediation action initiated by the remediation suggester to mitigate against the cyber-attack. The AI based cyber security system can further include one or more processing units to execute software instructions associated with the importance node module, the attack path modeling component, the cyber security appliance, and the remediation suggester module, and one or more non-transitory storage mediums to store at least software associated with the with the importance node module, the attack path modeling component, the cyber security appliance, and the remediation suggester module.

Existing graph theory-based tools are typically limited in their access to a specific type of data. For instance, while some commercially available graph theory-based techniques simply use a single data source such as active directory, others focus only on internal or external aspects of an organisation. A skilled cyber adversary, however, strives to exploit vulnerabilities spanning a wide variety of domains, internal and external to an organization. As a result, sourcing data across those domains is critical to creating a realistic, end-to-end model of attack paths exploited by cyber adversaries. Such domains can include, but are not limited to: email domains, active directory domains, SaaS/Cloud, Endpoint, network and vulnerability management. If one or more of these domains is overlooked, the security team will be unable to fully identify or evaluate vulnerabilities to attack. Nor will it be possible to optimize defensive resources and remediation efforts. Ignoring one or more of these aspects, may result in an incomplete evaluation of an organisations vulnerability to compromise and ultimately non-optimal allocation of defensive resources and/or remediation efforts.

The graph theory module cooperating with the importance node module can utilize a graph theory to derive multi-domain, risk-prioritized attack paths within the computer networks for cyber-attack path modelling throughout the entity's multiple domain network including at least cloud, IT network, and email network, in order to prioritize mitigation of a cyber-attack when the AI based cyber security system, or the cyber security appliance, takes the autonomous remediation action initiated by the remediation suggester to mitigate against the cyber-attack. The graph theory module can use an active directory that answers to what uses an unweighted directed graph. Further, the the graph module can create a second graph of the nodes that the user i) connects to, ii) move to, or iii) users device connects to.

The importance node module 105 can utilize artificial intelligence models to model and simulate the cyber-attack occurrence. The artificial intelligence-based importance node module can determine and use a users presence, which can include an importance of the user, in a simulated cyber-attack analysis. As noted above, the attack path modeling component and the artificial intelligence-based importance node module can use the decay algorithm to decide what nodes in the network are of most importance to detect key devices or key users.

The reconciliatory module can reconcile different accounts associated with the user into one entity. Each of the different accounts can be associated with a corresponding risk. The reconciliatory module can further compute a device importance based at least in part on an interactivity of the device including data received by the device and data sent from the device and a level of sensitivity of the data accessible within the device and by the device. Subsequently, the reconciliatory module can compute an overall importance for each entity based on each of the different accounts associated with the user and each device importance of each device associated with the entity.

In some embodiments, upon a determination that a compromise is occurred, the attack path modelling component and the remediation suggester module can suggest a preemptive intelligent prioritization of remediation action to be performed on each node on the second graph connecting to the user.

Referring to FIG. 2, a visual representation of risk matrix in accordance with some embodiments of the present disclosure is shown. In several embodiments, the attack path modelling component can prioritize risk by assessing cyber-threat pathways, taking on the mindset of the cyber adversary probing the paths of least resistance. Risk can be defined as the product of two factors: event probability and event impact. Risk matrix can be represented visually as four quadrants with probability and impact assessed as low or high risk and ranked as minimal, intermediate or critical. Disclosed methods and systems can draw on a rich base of data produced by the machine learning engine, thus addressing vulnerabilities across all domains. Conceptually simple, a directed, weighted graph aims to estimate the probability that an adversary will be able to conduct successful lateral movement from node A to node B.

Referring to FIG. 3 now, basic principles associated with lateral movement probability estimation, in accordance with some embodiments of the present disclosure is shown. Nodes can be modelled as either devices or user accounts with a variety of attributes that influence the edge weight calculation. These weights can be calculated based upon passively collected data where possible and actively collected where confidence of edge probability is low. The evaluation of probability (represented by edge weight) can take into account a multitude of factors from a variety of data sources ranging from social engineering susceptibility to inferred likelihood of zero-day vulnerability development. Some examples of these and their corresponding data source requirements are:

I) Internal Socially Engineered Spear-Phish (Data source: Email)
  Pre-existing regular communication between source and target.
  Precedent for sending potentially executable file types i.e. scripts, macro-enabled docs.
  Source holds senior position within organisation to target.
  Result: High likelihood of successful internal spear phish leading to code execution on target.

II) Poisoned SaaS Resource (Data source: SaaS)
  Source device SaaS credential has write privileges to shared SaaS directory.
  Shared SaaS directory contains executable file types.
  Some of these executable type files are regularly read by other SaaS users.
  Result: High likelihood modified version of file will be executed by other SaaS users, resulting in code execution on their respective devices.

III) Broadcast Poisoning (Data source: Network)
  Source device in same subnet as target.
  Target device observed utilising broadcast name resolution protocol LLMNR.
  LLMNR hostname associated with SMB server.
  SMB Server code-signing is deactivated.
  Result: High likelihood of intercepted LLMNR request from target leading to re-directed SMB traffic to source and capture of authentication token.

In some embodiments, an impact is determined to calculate the risk. In contrast to the lateral movement probability, which is an edge property, the impact is an intrinsic node property. Conceptually, the impact score representing the impact can be a representative of the resulting negative impact to the organisation in the event that the node is compromised. In various embodiments, a variety of ways such as machine learning classification of sensitive SaaS and SMB resource paths or hierarchy analysis of user job roles from LDAP can be used to determine the impact score.

Referring to FIG. 4, a visual representation of impact score pre-propagation in accordance with some embodiments of the present disclosure is shown. In an embodiment, where a users job title or hierarchy information is known or is determinable, the users can be seeded with an impact score. FIG. 4 illustrates a relatively simple approach to automated impact assignment by using propagation via shared resource access. The system can start with one high impact user, e.g., the CEO, and no prior information regarding the other users or files. In such an embodiment, no classification has been run on the filenames. As shown in FIG. 4, the fact that only one user (other than the CEO) has access to the file, i.e., sensitive.xlsx, can imply that this file may be high impact. Furthermore, some of that importance is also propagated from the CEO to the one other user that also has access to the file.

Referring to FIG. 5 now, a visual representation of impact score post-propagation in accordance with some embodiments of the present disclosure is shown. In contrast to the scenario as shown in FIG. 4, the file in FIG. 5, i.e., boring.docx, is accessed by a large number of users alongside the CEO. As a result, the impact propagation from the CEO is diluted by the large number of other unknown impact users also having access. This impact propagation mechanism relies on the assumption of resource access segmentation assignment according to resource and/or user impact.

Referring to FIG. 6, a key server identification from network traffic patterns in accordance with some embodiments of the present disclosure is shown. In some embodiments, the AI based cyber security system identifies key server in the network. At an elemental level, an asset can be considered critical to a process if something is required from that asset in order for the process to continue as normal. This statement naturally extends into the domain of network assets and more specifically servers. If a significant number of client devices within an organisation are retrieving, i.e. a data ratio in favour of download, data from a server, that server is likely to be critical to the organisation. In other words, if that server was removed, the organisation would not be able to function as normal. As shown, server A is identified as a key server based on the large number of clients which depend on data from it.

Referring to FIG. 7, a key server identification and an impact propagation via network patterns in accordance with some embodiments of the present disclosure is shown. Server A propagates impact score to Server B due to its perceived reliance on data from Server B. Impact is not propagated to Server C due to data ratios implying lack of dependency.

However, in many cases, there exist additional servers, upon which the key servers depend, as shown in FIG. 7. While Server A has been identified as a key server due to its high count of unique clients with download heavy data ratios, Server B also provides data to Server A which is likely utilized in the process of delivering data to the clients. Consequently, impact from Server A is propagated to Server B as it appears likely that if Server B were removed, Server A would not function as normal and have an inability to provide data to the large client base. In contrast, Server C has only 2 clients in this instance: Server A and Server B. Both servers A and server B are preferentially uploading data to Server C, which in this case may be a logging server or similar. At the data transfer level, Servers A and B do not appear to depend upon Server Cs data for normal functionality.

All attack paths require a start point. In some embodiments, the AI based cyber security system considers at least one of the following main mechanisms for initial network penetration:

Phishing—generally email based, but naturally extends to any instant messaging capability that is addressable by an unknown entity Exploit externally facing server—once a new vulnerability is identified, attackers will utilise full IPv4 scan data to identify valid targets for exploitation.

Drive-by exploit—typically associated with malicious re-direction from already questionable websites.

Insider—for organisations with very strong perimeter defences, this may well be the most viable method of ingress for a determined threat actor.

Third-party-compromise—comparable to the Insider ingress but in device/software form as opposed to a human.

In principle, any human controlling a device with internet access is vulnerable to social engineering. Additionally, any device which is externally facing, can also be considered a potential ingress point. However, there are a variety of factors which might influence the probability of ingress for a user or externally facing server:

I) User:

Results of previous red-team assessment. If a user was previously successfully phished, one may assume that they retain that proven susceptibility.

User email exposure/perceived target value. This can be estimated by monitoring the number of phishing emails targeting the user. Typically, these will be an intersection between perceived high privileges and low technical knowledge, such as a CEOs personal secretary.

Patch-level of the user devices. If a user does not regularly run software updates, their security awareness level is likely to be lower than someone who does.

User web-browsing habits—if the user frequents low-trust endpoints, they are more liable to malvertising redirection.

II) Externally-facing-server

Patch-level—if an external server remains unpatched, they are highly likely to be exploited.

Service Port—if the service is running on a non-standard port, the presence of the server is less likely to be detected during full IPv4 scans.

Whether or not the server has cloud-storage permissions

The AI based cyber security system can used the inferred ingress probability associated with the starting node to modulate the overall probability associated with a given attack path, yielding a more realistic, risk-prioritised output.

With representative estimates of the lateral movement probability graph, node impact scores and ingress probabilities, the AI based cyber security system can finally execute the attack path modelling simulation. The simulation can be run in the following manner:

Threshold is applied to node importance values in order to determine target nodes.

Dijkstras algorithm is utilised to calculate shortest paths from all possible ingress nodes to all target nodes.

The attack paths are then weighted according to total impact per unit path length and modulated according to ingress probability associated with the start node.

The modelling process can produce a comprehensive set of risk-prioritised attack paths, giving the cyber security team the opportunity to evaluate how best to use this new information. Further simulation can be run to identify the edges which, if neutralised, would minimise the total risk of all derived attack paths. In some circumstances complete remediation of some edges is not possible—in such events, it may be beneficial to automatically heighten sensitivity to events associated with these high-risk nodes and edges.

Figure 8:
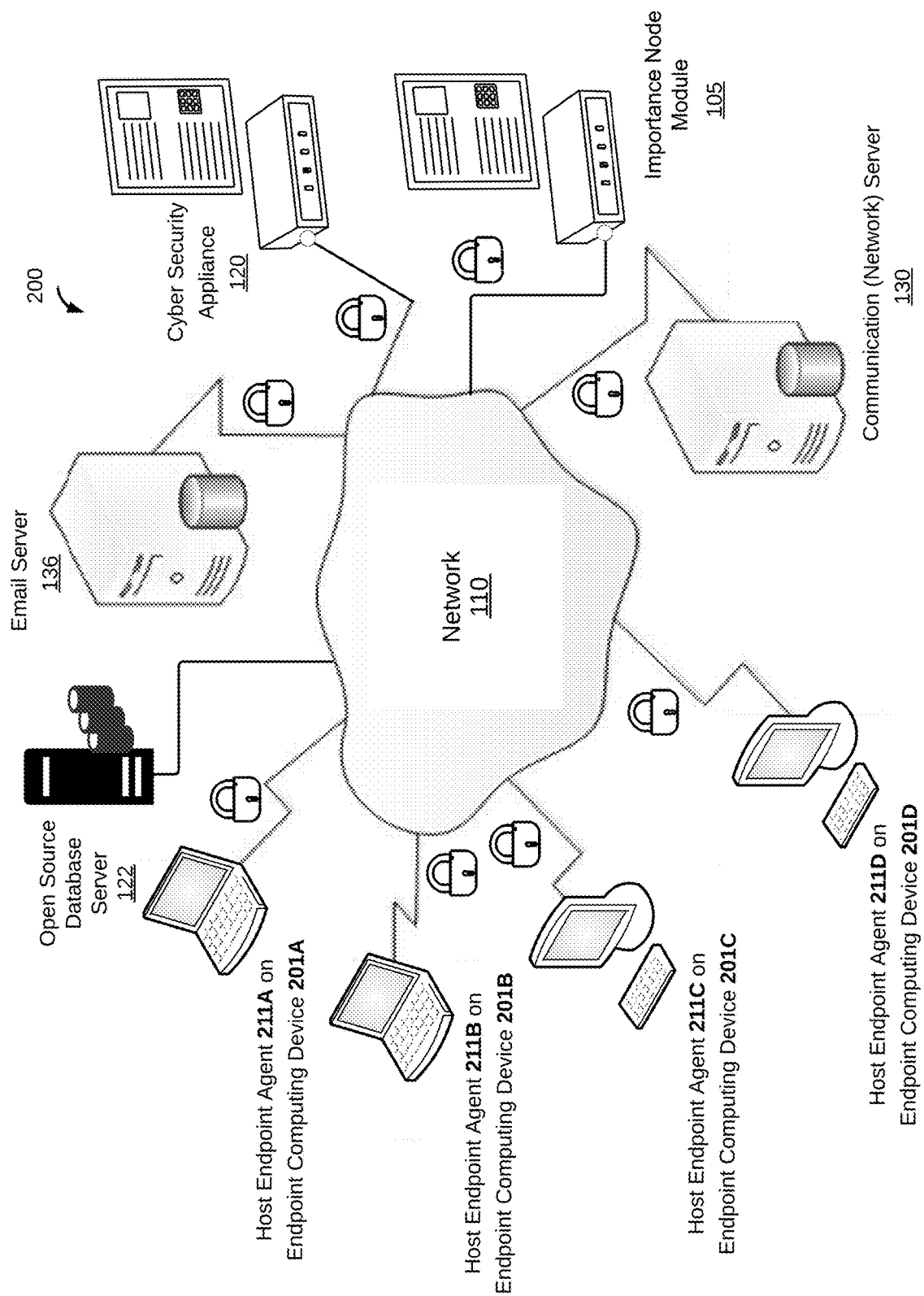
FIG. 8 illustrates a block diagram of an AI based cyber security system having a set of modules configured to cooperate with a cyber security appliance to predict an autonomous response to a detected cyber incident, in accordance with an embodiment of the disclosure.

FIG. 8 illustrates an overview of various aspects of an AI based cyber security system having a set of modules configured to cooperate with a cyber security appliance to counter a cyber incident, in accordance with an embodiment of the disclosure. To improve the efficiency of the AI based cyber security system, a reliable cyber AI loop requires the AI based cyber security system to: i) detect the cyber incident, which is to identify, investigate, and understand the full extent of a cyber incident, ii) respond to the cyber incident, which requires immediate treatments that pause or delay the problems caused by the cyber incident, iii) heal, which includes treatments, likely slower than the respond step, that return the network operations to a healthy state and avoid relapses, and iv) prevent, which includes to predict the next events in the incident and take measures to prevent them.

To achieve such an extended detection as in i) the AI based cyber security system can be able to consider the incident as a graph in which the nodes are denoting the physical devices, user accounts, and service, and in which the edges are actions and transactions between them. Such a graphical representation of the incident can significantly enhance the AI models and increases human understanding of the events and provides the user with a big picture of the operating network.

Similarly, to achieve such an extended detection as in ii) the AI based cyber security system can extend its existing autonomous response actions and related AI models on nodes and edges, and access a full incident context. The AI based cyber security system can further act by obtaining the users confirmation or alternatively, be fully autonomous.

Additionally, in order to be able to heal the network upon infecting by the cyber threat, as in iii) the AI based cyber security system can run a diagnosis to determine the entities (nodes) involved, what damages to those entities has happened (i.e., edges), how to heal these damages, the order of healing those damages, and how much the AI based cyber security system can help to inform, arrange or action itself.

Similarly, in order to be able to prevent future cyber-attacks as in iv) the AI based cyber security system can ask specific questions to run the hypothetical simulations regarding where the key event can happen (the nodes) and what methods can be used to propagate the attack (the edges). The AI based cyber security system can further determine that an attacked device may be likely a target of future attacks as well and prioritize its protection. Similarly, the AI based cyber security system can determine vulnerable groups of devices and prioritize their protection based on the fact that similar devices to one device of each of the vulnerable groups has already been attacked and therefore is at a higher risk, i.e., has a high task score. The AI based cyber security system can further determine that a known threat actor (a repeat attacker) has known techniques and targets and as a result, the AI based cyber security system can prioritize defending against such techniques and defending such targets for some time until the attacker is likely to have moved on or has changed their tools. Once confirmed that such a move on or such changes have occurred, the AI based cyber security system can lower the priority of the targets back to the normal.

Thus, AI based cyber security system can cooperate with the set of modules and the AI models and the importance node module to continuously monitor the entire environment in the absence of incidents and interact with ongoing incidents, which can be a single coherent threat, and include either a small number of related events or a very large number of related events.

As noticed above, various embodiments extend all four aspects mentioned above by disclosing the AI based cyber security system cooperating with the set of modules and the AI models and the importance node module to detect, based on interactions between the set of models, the AI models and the importance node module, an incident (e.g., an ongoing actual cyber threat). Actual feeding of the details of the detected incident into multiple hypothetical simulations of that incident will be performed by the importance node module in order to predict and/or control the autonomous response to the detected incident as well as subsequently improve the detection of the cyber threat causing that ongoing attack. The attacker may possibly alter their plans in response to being detected and when the cyber threat causing that ongoing attack alters its attack progress through the network in response to actions caused by the autonomous response, the importance node module is able to predict where and how the attacker makes their alterations, thus, suitable autonomous action can be taken. It should be noted that, all the detection and simulations occur in real-time (while the cyber-attack is occurring) with machine learning models understanding while pulling information from the importance node module running parallel simulations of the actual attack about what might happen in terms of what the cyber threat may do in response to the autonomous response and an impact on the network being protected.

The cyber security appliance 120 and/or the importance node module 105 can use resource impact propagation, which can include a way to determine an ease of compromising a user through a poison file attack. Details of such resource impact propagation is stated above.

In some embodiments, the AI based cyber security system can enable the user to intelligently evaluate whether to make changes in setting or the level of detected threat to trigger each different autonomous action shown and at what stage shown through the information. Moreover, the information provided by the AI based cyber security system can also show what would happen if upon detecting the threat on a first device, the cyber security appliance takes autonomous actions on key devices that are not demonstrably compromised yet. Thus, what would happen if a cyber threat was detected on one or more devices in the network, what happens if autonomous actions are taken on devices yet to be compromised but these actions are being triggered to mitigate the cyber threats impact on the network but trying to minimize inconvenience to other users of the network whose devices have not been compromised, and then the information showing the resulting different paths of lateral movement and overall compromise of the network when factoring in these autonomous actions on devices yet to be compromised at the time the cyber threat is detected on another device in the network.

In some embodiments, the AI based cyber security system 100 can include a user interface and a data management module residing in the importance node module 105. The importance node module 105, the cyber threat creator 106 and the data management module can cooperate with the data store and the user interface to record events in the cyber security appliance 120 and the network. The recorded events can include lateral movement and the set of devices and the set of user accounts compromised during the actual cyber threat attack in the network and actions taken by the cyber security appliance 120 to detect the actual cyber threat attack on the network, and actions taken by the cyber security appliance to mitigate the actual cyber threat attack.

In some embodiments, the user interface can be an application program interface. By recoding the network in operation, the user can monitor the events occurring inside the network in real-time while the network is running. The user can further extract information from the network through the user interface, e.g., API, and store the extracted information in a data store. The data store can be located outside the network, the cloud, local storage device, etc. The user interface can further display, on a display screen, the recorded events to a user and allow a user to watch and observe what is happening in the cyber security appliance and the network.

The AI cyber security system 100 may use any unusual detected behaviour deviating from the normal behaviour and then builds a sequence/chain of unusual behaviour and the causal links between the sequence/chain of unusual behaviour to detect any potential cyber threats. For example, AI cyber security system 100 may determine the unusual patterns by (i) filtering out what activities/events/alerts that fall within the window of what is the normal pattern of life for that network/system/entity/device/user under analysis; and (ii) then analysing the pattern of the behaviour of the activities/events/alerts that remain, after the initial filtering process, to determine whether that pattern is indicative of a behaviour of a malicious actor, such as a human, program, and/or any other cyber harmful threat. The AI cyber security system 100 may further return and retrieve some of the filtered out normal activities to help support and/or refute a possible hypothesis of whether that pattern is indicative of a behaviour of a malicious actor. For example, AI cyber security system 100 may use an analyser module (or the like) to cooperate with one or more AI models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Thereafter, the AI cyber security system 100 may also have a scoring module (or the analyser module itself) configured to assign a threat level score or probability indicative of what level of threat does this malicious actor pose (e.g., as shown with the scores depicted in the graph 600 of FIG. 12). Lastly, the AI cyber security system 100 may be configurable through the user interface, by a user, an analyst, and/or the like, used to establish one or more predetermined parameters (or inputs), if any, regarding what type of automatic response actions, if any, such modules in the AI cyber security system 100 should take when different types of cyber threats, indicated by the pattern of behaviours under analysis, are equal to and/or above a configurable threshold level of threat posed by this malicious actor.

As such, the endpoint devices 101A-B may be accessible and communicatively coupled to the cone creator 105, the cyber security appliance 120, and/or the entities 130-142 in the network defense system 125 via the network 110, the second firewall (FW-2) (or the front-end firewall FW-2), and the network 112. For example, as shown in FIG. 1, it should be observed that the endpoint devices 101A-B may communicate with the one or more entities 130-142 in the network defense system 125 respectively through each of the first and second firewalls FW-1/FW-2 as well as each of the first and second networks 110/112. Similarly, the importance node module 105 may communicate with the entities 130-142 in the network defense system 125 via the network 110 (e.g., the Internet), the front-end firewall FW-2, and then the network 112.

Furthermore, the endpoint devices 101A-B may be communicatively coupled to the cyber security appliance 120 via the first firewall defense (FW-1) and the first network 110, and to any of the entities 130-142 in the network defense system 125 via the second firewall FW-2 and the second network 112. In most embodiments, each of the devices 101A-B may be resident of its own respective host endpoint agents (e.g., as shown with the host endpoint agents 211A-B on the endpoint computing devices 201A-B depicted in FIG. 8). The endpoint devices 101A-B may include, but are not limited to, a mobile phone, a tablet, a laptop, a desktop, Internet of Things (IoT) appliance, and/or the like. Moreover, the endpoint devices 101A-B may be any variety of computing devices capable of cooperating with each other and/or with any of the entities, devices, networks, and so on, over any of the networks 110/112. In several embodiments, the endpoint device 101A may be configured to operate substantially similar to the endpoint device 101B. However, in other embodiments, the endpoint device 101A may be configured to operate different from the endpoint device 101B based on different user roles, permissions, hierarchical relationships, peer groups, etc., in that organization. The endpoint devices 101A-B may include host agents having multiple modules configured to cooperate with each other.

In some embodiments, the networks 110/112 may be implemented as an informational technology network, an operational technology network, a cloud infrastructure, a SaaS infrastructure, a combination thereof, and/or any other type of network capable of communicatively coupling one or more entities/endpoint devices to one or more other entities/endpoint devices. For example, at least one or more of the networks 110/112 may also include one or more networks selected from, but not limited to, an optical network, a cellular network, the Internet, a Local Area Network (LAN), a Wide Area Network (WAN), a satellite network, a cloud-based network, a fiber network, a cable network, any combinations thereof, and/or any other communications network capable of communicatively coupling the one or more endpoint devices 101A-B, the AI importance node module 105, and/or the cyber security appliance 120 to the OS database server 122 and any of the other entities (or servers) 130-142. Furthermore, in some embodiments, the network 110 may be an OT network and/or the like (e.g., the Internet), while the network 112 may be an IT network and/or the like.

As shown in FIG. 1, the cyber security appliance 120 may include multiple modules configured to cooperate with each other in conjunction with one or more modules residing in the endpoint devices 101A-B, the importance node module 105, and/or the various entities 130-142 in the network defense system 125. Furthermore, as described below in greater detail in FIG. 4, the cyber security appliance 120 may include one or more modules used to: (if) gather/collect data from the endpoint devices 101A-B and any other associated endpoint computing devices, users, and/or entities; (ii) analyze and score the gathered data; (iii) train AI and/or machine learning model(s) with the analyzed/scored data; (iv) determine, if any, autonomous response(s) based on the comparison between the analyzed/scored data and the trained data; (v) trigger the determined autonomous response(s), if any, directly on the respective host endpoint agents on the respective endpoint devices 101A-B; and (vi) communicate those triggered response(s), if any, with the users associated with those respective endpoint devices 101A-B. Whereas, other modules of the cyber security appliance 120 may be used to display data, metrics, etc., regarding other host endpoint agents residing on other respective local endpoint computing devices, where such data may be unified as translated data from those endpoint computing devices and the endpoint devices 101A-B.

The cyber security appliance 120 may be configured with various modules that reference at least one or more AI and/or machine learning models (e.g., as shown with the AI models depicted in FIG. 10), which may be trained on any normal patterns of life, potential cyber threats, behavior patterns (i.e., behavior pattern of life), host endpoint agents, and/or network patterns of life observed from various/all entities in order to protect such entities from any cyber threats within the AI based cyber security system 100. As such, the cyber security appliance 120 may cooperate with multiple (or all) modules and/or instances of the endpoint devices 101A-B, the entities 130-142, and/or the importance node module 105 to defend such entities, devices, users, and so on, that are communicatively coupled to one or more of the networks 110/112.

For example, the cyber security appliance 120 may use the at least one or more AI/machine learning models to analyze the pattern of life data for each endpoint device 101A-B and/or each entity 130-142, where each endpoint device 101A-B and entity 130-142 may be communicatively connected to one or more application programming interfaces (APIs) hosted by the cyber security appliance 120. This allows the cyber security appliance 120 to implement those AI/machine learning models trained on the respective endpoint computing devices 101A-B and entities 130-142 to: (i) analyze the collected pattern of life data for the respective host endpoint agents and the respective entity modules connected to the respective APIs hosted by the cyber security appliance 120; and (ii) then compare that analyzed pattern of life data against a normal pattern of life observed for those respective endpoint computing devices 101A-B and entities 130-142. Accordingly, this cooperation between the cyber security appliance 120 and the endpoint devices 101A-B and entities 130-142 may be used to protect against any unusual cyber security threats that may arise from maliciously harming networks, maliciously harming process chains, and so on.

As described above, the network defense system 125 may include one or more entities 130-142 depicted as one or more servers (or content-based server machines), which may be operable under the umbrella of the organizations IT networks, internal networks, and/or any other similar networks. The network defense system 125 may be implemented to protect all the entities 130-142 and any other entities that may connect to this organizations IT networks to transfer/store/retrieve/etc. data. For example, the AI cyber security system 100 may configure the network defense system 125 to protect all of the respective entities 130-142, external/internal email network(s), network-based entities (e.g., such as internal networking databases), and/or any other external/internal network systems associated with the organizations IT network systems and so on.

As shown in FIG. 1, the network entities 130-142 in the network defense system 125 may be accessible to the importance node module 105, the cyber security appliance 120, and/or the endpoint devices 101A-B, respectively via the network 110, the firewall FW-2, and the network 112. Furthermore, it should be noted that the endpoint devices 101A-B may communicate with the entities 130-142 in the network defense system 125 through both firewalls FW-1/FW-2 and both networks 110-112. Similarly, the importance node module 105 may access any of the respective entities 130-142 in the network defense system 125 via the network 110 (e.g., the Internet), the front-end firewall FW-2, and the network 112. Furthermore, the entities 130-142 may be connectable via the front-end firewall FW-2 and network 112 by having certain associated logging capabilities.

As shown in FIG. 1, the entities 130-142 residing in the network defense system 125 may include, but are not limited to, a communication server 130, a domain name server (DNS) 132, a web server 134, an email server 136, a proxy server 138, an FTP Server 140, and a file server 142. Similarly, any other entities (not shown) may be part of and reside in the network defense system 125, which may be relevant to collect data, store data, transfer data, and so on, such as an anti-virus server, a router, a gateway, and/or the like. Each of the entities 130-142 may be connectable via an internal client network such as the network 112. In some embodiments, more than one or more of the entities 130-142 may be associated with its own internal client network (not shown), where each client network may represent an organizational sub-section, department, peer group/team, and so on. Optionally, various of these internal client networks may be further protected behind one or more other internal firewalls (not shown). Note that, in other embodiments, the various entities 130-142 may be further associated with one or more additional client networks, each performing client functions or representing various sub-organization within an organizations network deployment.

Furthermore, as described above, the OS database server 122 may be connectable and used to periodically query, search, and retrieve specific data (or data points) pertaining to the organization and all its entities.

The AI based cyber security system 100 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data.

FIG. 8 illustrates a block diagram of an AI based cyber security system having a set of modules configured to cooperate with a cyber security appliance to counter a cyber incident. As shown, an AI based cyber security system 200 having a importance node module 105 communicatively coupled over a network 110 with at least one or more of a cyber security appliance 120, host endpoint agents 211A-D, endpoint computing devices 201A-D, and/or entities 122/130/136 is shown, in accordance with an embodiment of the disclosure. Similar to the importance node module 105 depicted above in FIG. 1, the AI based cyber security system 200 may implement the importance node module 105 depicted in FIG. 8 to simulate any of the depicted agents 211A-D, devices 201A-D, and/or entities 130/136 via the one or more secure communication channels established with the network 110. In several embodiments, as described above, the importance node module 105 and/or the cyber security appliance 120 may be configured to receive any collected email and network activities and behavior pattern data from any of the endpoint devices 201A-D, the host endpoint agents 211A-D, and/or the entities 130/136. Such host endpoint agents 211A-D may be located and executed on the respective endpoint computing devices 201A-D.

The AI based cyber security system 200 depicted in FIG. 8 may be substantially similar to the AI based cyber security system 100 depicted in FIG. 1. As such, in most embodiments, the endpoint devices 211A-D, the network 110, the importance node module 105, the AI based cyber security appliance 120, and the entities 130/136 depicted in FIG. 8 may be substantially similar to the endpoint devices 101A-B, the network 110 (and/or the network 112), the importance node module 105, the AI based cyber security appliance 120, and the entities 130/136 depicted and described in great detail above in FIG. 1.

In some embodiments, the network 110 may be: (i) an informational technology network, (ii) an operational technology network, (iii) a cloud infrastructure, (iv) a SaaS infrastructure, and/or (v) any combination thereof capable of being communicatively coupled to each of the respective importance node module 105, the cyber security appliance 120, the endpoint computing devices 201A-D, and/or the entities 122/130/136. The network 110 may be used to communicatively couple the endpoint computing devices 201A-D to at least one or more of the entities 122/130/136 and/or the cyber security appliance 120. Furthermore, as shown in FIG. 8, the endpoint computing device 201A may be communicatively coupled to the network 110 via a secure channel, whereas the entity 122 (i.e., the OS database server) may be communicatively coupled to the network 110 via an unsecure channel. In most embodiments, the one or more entities 122/130/136 may include, but are not limited to, any type of server, database, data store, and/or cloud-based server, service, application, etc. For example, the entities 130/136 may be similar to the entity 122, with the exception that the entity 122 is communicatively coupled over the unsecure (or open) channel, and thus has limited functions, network capabilities, and is not capable of receiving secured data from any of the other depicted entities in FIG. 8. The endpoint computing devices 201A-D and entities 122/130/136 may be any variety of computing devices capable of cooperating with the respective host endpoint agents 211A-D, the importance node module 105, and the cyber security appliance 120 over the network 110.

In some embodiments, the host endpoint agents 211A-D may be configured to reside on their respective endpoint devices 201A-D and to: (i) have a low system impact on their respective endpoint devices 201A-D and runs without degrading its performance significantly; (ii) monitor the "pattern of life" of their respective endpoint devices 201A-D (e.g., including monitoring at least one or more of: (a) process behavior (use of network, filesystem, etc.), (b) relationships between processes (parent/child, shared files, IPC, etc.), and/or (c) user behavior (applications commonly used, IT habits, etc.); (iii) make reports on pattern of life metadata, events and alerts to an API whenever connected to the internet or LAN, and while offline, cache data to deliver when possible; (iv) assist in performing IT audits while also completing pattern of life data and events (e.g., including assisting in at least one of more of: (a) audit system details, for example installed operating systems, installed software, software versioning, security update status, etc.; (b) gather system usage activity such as shutdown periods, login failures, file modifications, network connections, etc.; and/or (c) record use of external devices or transfer protocols (e.g., USB usage, Bluetooth usage, email usage, etc.); and/or (v) lastly react autonomously to anomalies in pattern of life (e.g., including responding with at least one or more actions to: (a) cooperate with the appliance 120 with its significantly greater processing power, sets of models including, for example, pulling when available, any actions to be taken and/or be able to take a limited set of actions when a connection to the cyber defense system 200 is not available; (b) provide an operator with the ability to enable the respective host endpoint agents 211A-D to perform a select number of relatively simple actions, when predefined conditions of suspicious behavior and/or anomaly scores/levels are met, independent of the cyber defense appliance; and/or (c) simple and default actions such as actions to prompt user, quarantine a suspicious process (from network access and process as well as internal computing devices process and filesystem), shutdown the offending processes, and so on).

After unleashing the cyber threat, the AI based cyber security system 200 may locate all identifiable employees via public open sources databases/servers 122, such as LinkedIn, industry group and team pages on a company's website, Google, press releases, etc. and then retrieves the employee names, job titles, and another needed/desired inputs. For example, these threat scenarios may include, but are not limited to, (i) Interesting and relevant news article from manager to subordinate, (ii) A critical security patch reminder from manager to subordinate; (iii) Identify payroll management and spoof from relatively important employee to change the details of monthly salary payments; (iv) Identify accounts/finance employees to target for business email compromise style attacks and/or similar styles (e.g., an attempt to submit a fake Purchase Order and so on); and/or (v) and other similar customizable activities and scenarios for attacks on that company.

The AI based cyber security network environment may use the importance node module 105—in cooperation with the cyber security appliance 120 if needed perform multiple hypothetical simulations based on the detected incident in this network environment in order to then train and specifically identify any potential vulnerabilities/risks in this environment. The AI based cyber security network environment may be configured as a communications network. The network may include one or more networks selected from, but not limited to, an optical network, a cellular network, the Internet, a LAN, a WAN, a satellite network, a $3^{rd}$ party "cloud" environment, a fiber network, a cable network, and/or any combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system) may communicate with the server(s). The client computing system may include, for example, the software application or the hardware-based system in which may be able exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud users cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be configured to utilize a protocol, such as hypertext transfer protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access may be configured to engage in: the request and response cycle from all web browser based applications; the request and response cycle from a dedicated on-line server; the request and response cycle directly between a native application resident on a client device and the cloud-based remote access to another client computing system; and/or combinations thereof.

In an embodiment, the server computing system may include a server engine, a web page management component, a content management component, and a database management component. The server engine may perform basic processing and operating system level tasks. The web page management component may handle creation and display, or routing of web pages or screens associated with receiving and providing digital content and digital advertisements. Users (e.g., cloud users) may access one or more of the server computing systems by means of a uniform resource locator (URL) associated therewith. The content management component may handle most of the functions in the embodiments described herein. The database management component may include, but is not limited to, storage and retrieval tasks with respect to the database, queries to the database, storage of data, and so on.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any hypertext markup language (HTML), wireless access protocol (WAP) enabled client computing system (e.g., the client computing system), and/or any equivalent thereof.

The client computing system may host a browser and/or a specific application to interact with the server computing system. Each application has a code scripted to perform the functions that the software component is configured to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

Figure 9:
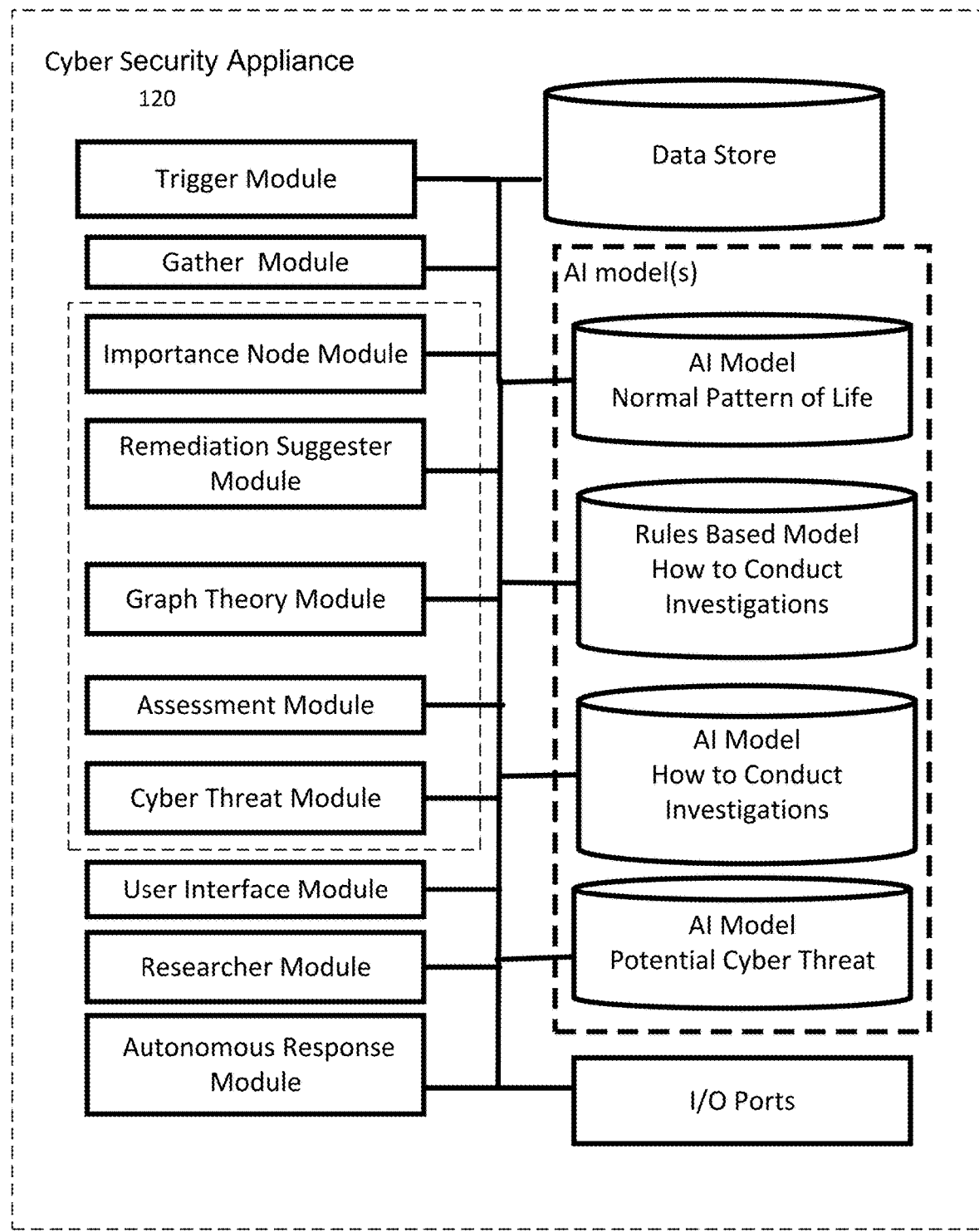
FIG. 9 illustrates a block diagram of an exemplary AI based cyber security platform having a cyber security appliance configured to predict an autonomous response to a detected cyber incident, in accordance with an embodiment of the disclosure.

Referring now to FIG. 9, a cyber security appliance 120 with various modules cooperating with various AI/machine learning models trained on various observed data points is shown, in accordance with an embodiment of the disclosure. The cyber security appliance 120 may cooperate with the set of modules, the AI models and the importance node module 105 depicted in FIG. 1 to protect against cyber security threats from maliciously harming networks as well as from maliciously harming any entities connecting to that network of the organization, where the cyber security appliance 120 is installed, by implementing the importance node module 105 (and, if needed, in cooperation with the cyber security appliance 120) to perform multiple hypothetical simulations based on the detected incident in order to identify all potential risks for that organization and all its entities and users. The cyber security appliance 120 and the importance node module 105 depicted in FIG. 4 may be substantially similar to the cyber security appliance 120 and the importance node module 105 depicted above in FIG. 1. As such, in most embodiments, any of the modules, trained AI models, and AI classifiers referenced and discussed in reference to the importance node module 105 in conjunction with the cyber security appliance 120 may be substantially similar to any of the modules, trained AI models, and AI classifiers.

The cyber security appliance 120 may include components one or more modules, stores, and/or components, including, but not limited to, a trigger module, a gather module (or a collections module), a data store, a host module, a user interface and display module, an autonomous response module, at least one input or output (I/O) port to securely connect to other network ports as required, and the importance node module 105.

As noted above, the importance node module 105 with one or more of cooperating modules in FIG. 4 may be substantially similar to the importance node module 105 and all of its cooperating modules depicted in FIG. 1. For example, in most embodiments, the importance node module 105 may be configured to duplicate the network, the machine learning algorithms and the cyber security appliance.

Furthermore, the cyber security appliance 120 may include one or more AI and machine learning models such as, but not limited to, a first set of AI models (i.e., the AI model network pattern of life) trained different aspects of the network including users, devices, system activities and interactions between entities in the system, and other aspects of the system; a second set of AI models (i.e., the AI model host pattern of life) trained on pattern of life of host/endpoint computing devices hosting instances of the respective endpoint agents (e.g., trained on the pattern of life pertaining to the endpoint devices 101A-B) including: the users, the multiple software processes, relationships between the software processes, device operation, operating system configuration changes, and other such aspects; a third set of AI models (i.e., the AI model potential cyber threats) trained on any variety of potential cyber threats; and one or more other types of AI models (i.e., the AI model normal pattern of life), each trained on different types of computing devices and operating systems for each type of particular computing device, and other aspects of the systems, as well as other similar components in the cyber security appliance 120. The one or more modules utilize probes to interact with entities in the network (e.g., as described above with the probes depicted in FIG. 3). It should be noted that many of these modules shown in FIG. 4 are substantially similar to the respective modules used in the endpoint devices 101A-B and/or the cyber security appliance 120 described above, such that those respective modules may be referenced herein without any limitation.

The trigger module may detect time stamped data indicating one or more events and/or alerts from unusual and/or suspicious behavior/activity that are occurring and may then trigger that something unusual is happening. Accordingly, the gather module may be triggered by specific events and/or alerts of anomalies, such as an abnormal behavior, a suspicious activity, and/or any combination thereof. The inline data may be gathered on the deployment from a data store when the traffic is observed. The scope and wide variation of data available in the data store results in good quality data for analysis. The collected data may be passed to the various modules as well as to the data store.

The gather module (or the collections module) may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation may occur between the gather module and the various modules including, but not limited to, the network module, the host endpoint agent coordinator module, the communications module, the cyber threat module, and/or the researcher module.

In addition, the coordination occurs between the above modules and the one or more AI models trained on different aspects of this process. The cyber threat module may cooperate with the network module and the host endpoint agent coordinator module to identify cyber threats based on analysis and determinations by the analyzer module, the anomaly score module, and such. Each hypothesis of typical cyber threats may have various supporting points of data and other metrics associated with that possible threat, such as a human user insider attack, inappropriate network behavior, inappropriate behavior in a particular endpoint computing device, etc. The AI/machine-learning algorithm may look at the relevant points of data to support or refute that particular hypothesis of what the suspicious activity or abnormal behavior related for each hypothesis on what the suspicious activity or abnormal behavior relates to. Networks may have a wealth of data and metrics that may be collected. The gatherer modules may then filter or condense the mass of data down into the important or salient features of data. In an embodiment, the various modules may be combined or kept as separate modules.

The network module and/or the communications module may receive data on the network from the set of probes. For example, each host endpoint agent 101A-B may communicate and exchanges information with the cyber security appliance 120. The network and/or communications modules may reference any of the various available AI machine learning models. The endpoint agent coordinator module may reference one or more of the AI models, using machine learning and Artificial Intelligence algorithms, that are trained on a normal pattern of life of that endpoint computing device with that host endpoint agent 101A-B. The network module may also reference one or more AI/machine learning models, using machine learning and AI algorithms, that are trained on a normal pattern of life of the network.

A researcher module (or a comparator module) may compare the received data on the network and/or the endpoint devices 101A-B to the normal pattern of life for these individual entities and others in the wider network context in order to detect anomalies and any future potential cyber threats. Note that, once the normal pattern of life has been learned by the models, the network module, the endpoint agent coordinator module, and/or the researcher module may readily identify the anomalies in the normal pattern of life and thus any unusual behaviors from the devices, users, or other aspects of the network and its associated host/endpoint computing devices. Also note that, once the normal pattern of life has been learned by the models, any other modules may be configured to cooperate together to readily identify the anomalies in the normal pattern of life and thus any unusual behaviors from the devices, users, or processes of the network and so on.

The coordinator module may analyze and integrate both activities occurring in the network as well as activities occurring internally within each end-point computing-device at the same time when analyzing the detected anomalies in the normal pattern of life in order to detect the cyber threat. For example, each host endpoint agent may provide pattern of life data to the cyber defense appliance so it may derive pattern of life for each end-point computing-device.

The graphical user interface may display metrics, alerts, and events of both the network in light of activities occurring in endpoint computing device on a common display screen. The graphical user interface allows a viewer to visually contextualize the metrics, alerts, and/or events occurring in the network in light of the activities occurring in the endpoint computing-devices on the common display screen. The graphical user interface also allows a viewer to then to confirm the detected cyber threat in view of what is happening in the network as well as in the endpoint computing devices.

The cyber threat module may compare one or more of the detected anomalies by referencing one or more machine learning models trained on, at least, the cyber threat. Multiple AI/machine learning models may be trained, each model trained on a category of cyber threats and its corresponding members or each model trained on its own specific cyber threat. The cyber threat module cooperates and communicates with the other modules.

The cyber security appliance 120 may supplement the data provided to the users and cyber professionals using a researcher module. The researcher module may use one or more artificial intelligence algorithms to assess whether the anomalous activity has previously appeared in other published threat research or known lists of malicious files or Internet addresses. The researcher module may consult internal threat databases or external public sources of threat data. The researcher module may collect an outside data set describing at least one of an action or a state related to the cyber threat present outside of the network from at least one data source outside the network.

The cyber security appliance 120 may then take actions in response to counter detected potential cyber threats. The autonomous response module, rather than a human taking an action, may be configured to cause one or more rapid autonomous actions in response to be taken to counter the cyber threat. In some embodiments, the user interface for the response module may program the autonomous response module (i) to merely make a suggested response to take to counter the cyber threat that will be presented a display screen and/or sent by a notice to an administrator for explicit authorization when the cyber threat is detected; and/or (ii) to autonomously take a response to counter the cyber threat without a need for a human to approve the response when the cyber threat is detected. The autonomous response module may then send a notice of the autonomous response as well as display the autonomous response taken on the display screen.

The cyber threat module may cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

It should be understood that the cyber security appliance 120 may be hosted on any type and number of computing devices, servers, etc., and/or may be configured as its own cyber threat appliance platform, without limitations.

Figure 10:
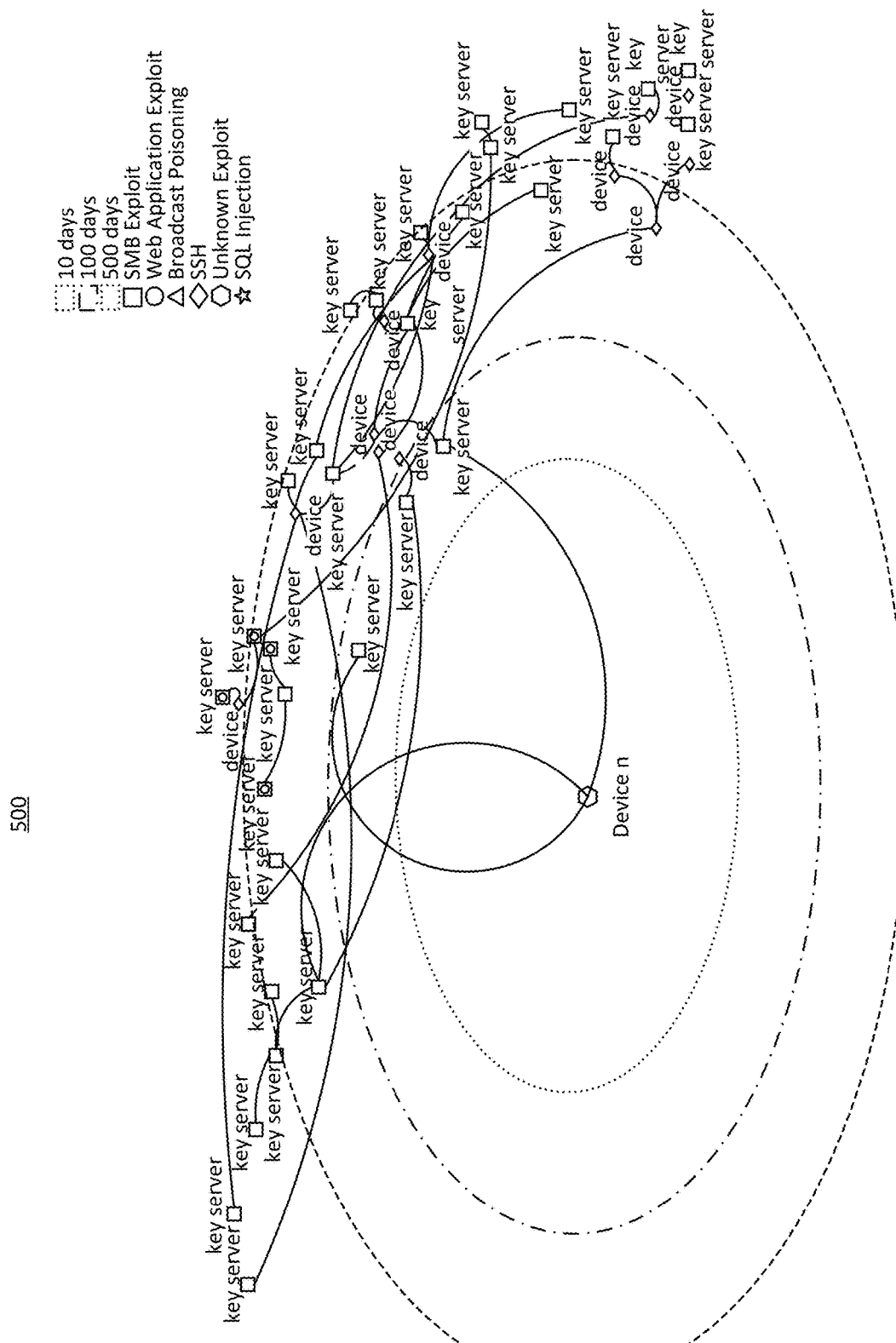
FIG. 10 illustrates a block diagram of a cyber security appliance with various modules cooperating with various machine learning models trained on the discrete pattern of life of one or more email and network connectivity and behavior pattern data, in accordance with an embodiment of the disclosure.

Referring now to FIG. 10, an exemplary graph 500 of a generated example of a cyber threat-infested network is shown, in accordance with an embodiment of the disclosure. For example, the graph 500 may be used to illustrate an attack by a cyber threat in conjunction with trained AI models cooperating with AI classifiers in producing a list of specific organization-based classifiers for those AI classifiers.

As shown in FIG. 10, initially, the cyber threat is unleashed in the network. The cyber threat may then initiate a specific attack on a specific user that activates, for example, a spoofed payload and thus executes on a device "n" (as shown with the focal and initial "Device n" in FIG. 10) in the organization. In some embodiments, the importance node module may be configured to cooperate with the analyzer module and communicate with the profile manager via one or more APIs hosted by the cyber security appliance. As described above, the profile manager module may be used to capture the graph 500, as the profile manager module is configured to maintain all of the profile tags on all of the devices and entities of the organization connecting to that depicted network under analysis. Furthermore, the network module may be used to capture the graph 500, as the network module is particularly used to cooperate with one or more network probes ingesting traffic data of, for example, the depicted network entities, devices, paths, and so on in the depicted network defense system. One or more particular profile tags may be maintained based on their behavior pattern data observed by using the ingested data from the email and/or network modules in conjunction with the trained AI models modelling the normal pattern of life for those entities, devices, paths, etc., depicted in that network defense system in order to obtain those depicted network connectivity and behavioral knowledge and patterns about each of those specific entities, devices, paths, etc., shown with the exemplary graph 500 in FIG. 10.

In other embodiments, the graph 500 may be used to generate an example of that network under analysis used to depict how vulnerable that system in that organization is in regard to the unleashed cyber threats being unleashed in the network on connections between the depicted entities and devices connected to that initially compromised device "n" in that network. As such, the AI based cyber security system may be configured to create the graph of the virtualized network, with its nets and subnets. Each device connecting to the virtualized network is represented as a node in the graph. Two or more of the devices connecting to the virtualized network are assigned with different weighting resistances to malicious compromise from the cyber threat being unleashed during the attack. As discussed later, some devices will be easier to compromise, and some will be harder to compromise.

For example, the exemplary constructed graph 500 of FIG. 10 may be of a virtualized instance of a network including: i) devices connecting to the virtualized instance of the network as well as ii) connections and pathways through the virtualized starting from a source (reduced to a portion of the graph due to size restrictions of this drawing). The source device 'n' is initially compromised by a cyber threat and the end results of a spread of the compromise in a simulation of an example cyber-attack scenario. The dotted circular lines going out from the source device 'n' represent bands of time, such as a number of days e.g., 10 days, 100 days, etc., before various devices on the network will likely be compromised by a given cyber threat in the example cyber-attack scenario. The AI based cyber security system constructs a graph for all devices on each of the subnets in the network that source device 'n' may possibly connect to or get to.

In this example, the AI based cyber security system starts off with an assumption that all systems are vulnerable and for each hop in the network, the algorithm seeks the path of least resistance to get closer to the end goal of the cyber-attack scenario while factoring in profile tags of users and devices, restricted subnets, and other defence mechanisms, such as firewalls, antivirus programs based on matching known virus signatures cooperating with the cyber security appliance (e.g., the cyber security appliance 120 in FIG. 1), etc., are used to make corresponding devices less vulnerable to compromise from the cyber threat. All paths may be considered by the AI based cyber security system (even an unknown exploit or social engineering exploit that shouldn't be a possible pathway through the network) and then the quickest is sought, rather than searching for known vulnerabilities in the whole network and then plotting a course.

Note that, in some embodiments, an end goal algorithm may be triggered to back track a number of compromised devices to calculate a time duration to taking alternative pathways when the last 'x' number of hops through compromised devices does not significantly get the spread of the cyber-attack closer to achieving the end goal of that cyber-attack scenario. The AI based cyber security system may be configured to search and query i) ingested network traffic data as well as ii) analysis on that network traffic data from a data store, from one or more modules, and from one or more AI models within the cyber security appliance. The AI based cyber security system has access to and obtains a wealth of actual network data from the network under analysis from, for example, the data store, modules, and the AI models of normal pattern of life for entities in the network under analysis, which means thousands of paths of least resistance through possible routes in this network may be computed during the simulation even when one or more of those possible routes of least resistance that are not previously known or that have not been identified by a human before to determine a spread of the cyber threat from device-to-device.

For example, the network module of the cyber threat defence appliance already maintains a map of historic connectivity between all devices in the network in order to detect 'new' connections as well as model the normal traffic patterns from components connecting to the network, so the AI based cyber security system may use this as a map of all possible routes to hop to. The AI based cyber security system looks at all known devices that device 'n' has connected to, and the ports and other connection pathways each of these devices used to send traffic or otherwise communicate with each other and devices external to the network, and then calculates the weighting of how difficult it would be to infect/compromise each device. Note the difficulty to compromise a device may be a representation of time taken to infect/compromise a device with the cyber-attack. Difficulty may be calculated based upon the assigned profile tag of the target device. That is, the device with a profile tag of, for example, Windows XP or LLMNR with a human user would have a weighting of 1 (easiest) to transmit to. Note, those devices with profile tags of an anti-virus user or technical user tags would get a slight defence boost which reduces their weighting meaning a longer time to compromise this device.

The AI based cyber security system may also look at other factors. The AI based cyber security system team also identifies recent credentials seen on device 'n' and looks for their use on other devices (as attackers dump credentials from memory on infected devices). The AI based cyber security system may take in manual input on restricted subnets and other factors from the user interface window presented to the user. However, as discussed before, by having access to a wealth of network data from the data store and other components inside that the cyber security appliance, then the AI based cyber security system may impliedly figure out restricted subnets for each device on the network and pathways unknown to human cyber professionals operating this network. For example, when the historic records show that the device 'n' has never accessed any device in a given subnet, then it is likely device 'n' is restricted from having access to that given subnet. In addition, a likelihood of the compromise of a virtual device being simulated may be tailored and accurate to the corresponding actual device being simulated because the cyber-attack scenario is based upon security credentials and behaviour characteristics from actual traffic data fed to the modules, data store, and AI models of the AI based cyber security system (in addition to the cyber security appliance in some embodiments).

Again, some similar concepts and AI training from the mathematical modelling of infectious disease spreading may be applied to cyber threats such as software viruses, malware, insider data theft, and other forms of malicious cyber threats spreading and attacking entities on a network, including key servers. The AI based cyber security system may be configured to determine how likely a cyber-attack may spread in a determined amount of time, such as hours, days, etc., to successfully infect/compromise 1) all components, 2) a maximum number of components within a given time duration, 3) 'x' number of key servers, 4) or other end goal selected by default or set by the user on the network. The AI based cyber security system may monitor the spread of a cyber-attack by drawing a graph of a devices connected a subnet and each subnet making up a network and then weighting the graph based upon how likely it would be for the cyber-attack to spread. Also, the AI based cyber security system may be configured to determine how severe it is when a particular component that the malicious cyber threats spread to, is infected.

The AI based cyber security system may be configured to use these AI models initially trained on spread of the disease, which are then retrained on the spread of malicious cyber threats through different devices on a network. Machine learning can repurpose graph theory analysis from other applications such as epidemiology to the lateral movement of an attacker through a network. The re-training combines i) knowledge of cyber threats, ii) knowledge of 1) security features and credentials, and 2) characteristics of network devices, and iii) other network specific information, such as information technology network information, email network information, SaaS environment information, Cloud information, etc., and iii) previous concepts and training from the mathematical AI modelling of infectious diseases to analyse network systems (e.g., email, IT network, SaaS, cloud, industrial networks, etc.) under analysis and make targeted predictions as well as provide validation of theoretical scenarios and attacks via the one or more modules of the AI based cyber security system, which is then depicted as a simulated and detailed graph (such as the graph 500) and then provided to the organization as a detailed generated and formatted report.

Figure 11:
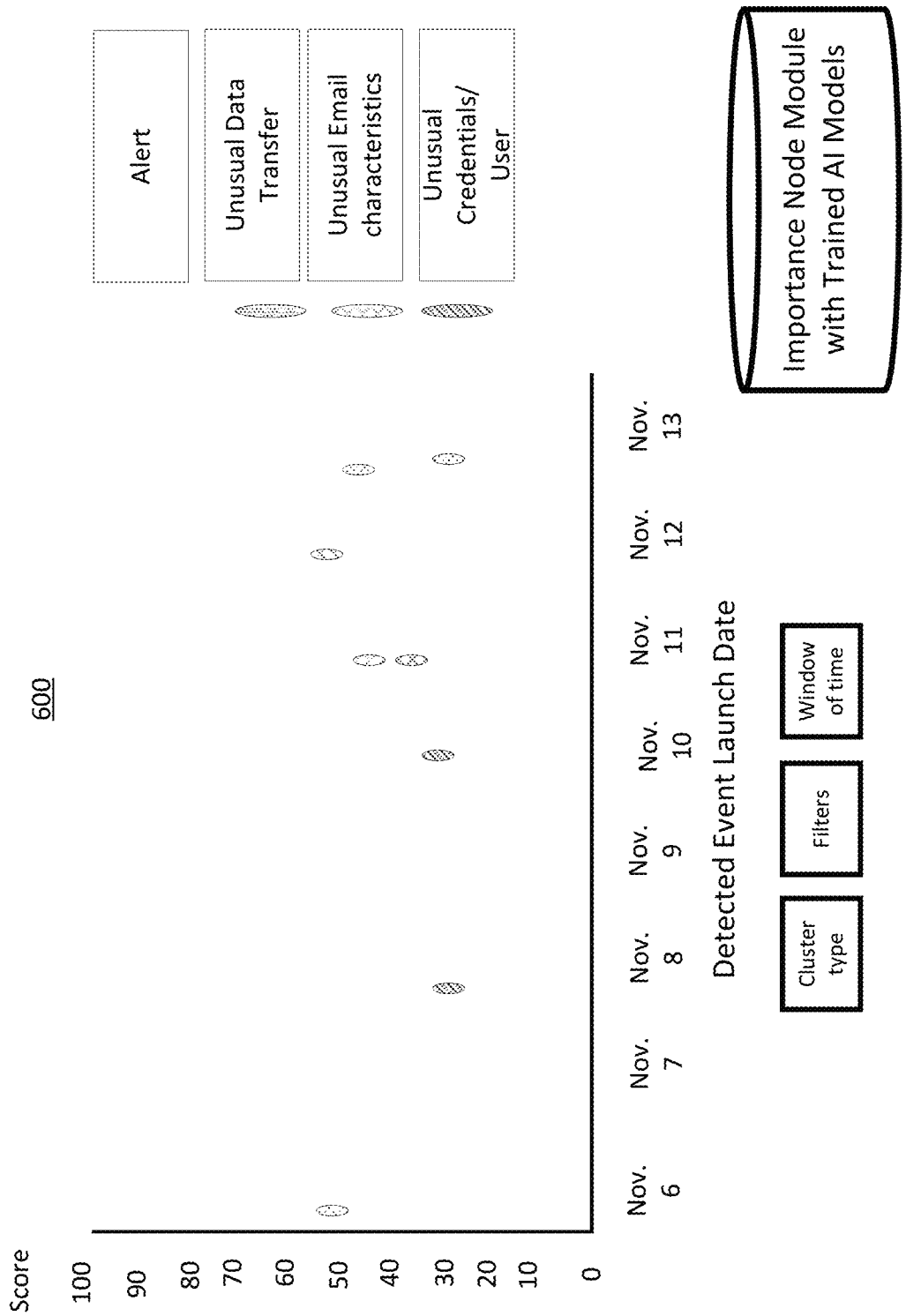
FIG. 11 illustrates an exemplary graph of a cyber threat-infested network used to illustrate multiple vulnerabilities of the network, in accordance with an embodiment of the disclosure.

Referring now to FIG. 11, an exemplary graph 600 for depicting events and alerts triggered by various detected unusual network connectivity and behaviour pattern data in relation to their cyber-threat scores and detected event launch times is shown, in accordance with an embodiment of the disclosure. The graph 600 may depict a cluster of unusual behaviors detected and analyzed in an AI cyber security platform, where the cluster of detected unusual behaviors may include, but are not limited to, any detected unusual payload activations based on any email and network activity and/or data transfers as well as any other unusual behavior patterns. For example, the graph 600 may depict one or more different machine learning models (as described above) that are trained to analyze any detected unusual behavior patterns from the collected pattern of life data against the normal pattern of life from any collected data from any of the entities in the organization. For example, the AI based cyber security system may use its analyzer module and cooperating modules to ingest all (or some) of this data to create various automated phishing emails and attack scenarios for any specific entities and/or users of that organization, where all of the detected and analyzed email/network activity and behavior pattern data may be particularly used to customize those phishing emails for that organization.

In some embodiments, the graph 600 may be provided as a user interface used to show a user the cluster of alerts and/or events associated with the variety of detected unusual email/network activity, data transfers, and behavior patterns, which may further include the respective detailed labels of the characteristics of such detected alerts and/or events. Note that, in these embodiments, the AI based cyber security system may utilize any of the AI models described above for any of its trained contextual knowledge of the organization which includes language-based data, email and network connectivity and behavior pattern data, and historic knowledgebase data.

In other examples, a behavioural pattern analysis of what are the unusual behaviours of the email/network/system/device/user under analysis by the machine learning models may be as follows. The cyber defence system uses unusual behaviour deviating from the normal behaviour and then builds a sequence of unusual behaviour and the causal links between that sequence of unusual behaviour to detect cyber threats as shown with the graph 600 in FIG. 11. In additional embodiments, the unusual patterns may be determined by filtering out what activities/events/alerts that fall within the window of what is the normal pattern of life for that network/system/device/user under analysis, and then the pattern of the behaviour of the activities/events/alerts that are left, after the filtering, can be analysed to determine whether that pattern is indicative of a behaviour of a malicious actor—human, program, or other threat. Next, the cyber defence system can go back and pull in some of the filtered out normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defence system is configurable in a user interface, by a user, enabling what type of automatic response actions, if any, the cyber defence system may take when different types of cyber threats, indicated by the pattern of behaviours under analysis, that are equal to or above a configurable level of threat posed by this malicious actor.

The AI models may perform by the threat detection through a probabilistic change in a normal behaviour through the application of an unsupervised Bayesian mathematical model to detect behavioural change in computers and computer networks. The core threat detection system is termed the 'Bayesian probabilistic'. The BP approach can determine periodicity in multiple time series data and identify changes across single and multiple time series data for the purpose of anomalous behaviour detection. From the email and potentially IT network raw sources of data, a large number of metrics can be derived each producing time series data for the given metric.

The detectors in the analyser module including its network module (importance node module can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analysing various aspects of the emails, iii) coming from specific devices and/or users within a system, etc. At its core, the AI adversary red team as well as the cyber security appliance may mathematically characterize what constitutes 'normal' behaviour in line with the normal pattern of life for that entity and organization based on the analysis of a large number/set of different measures of a devices network behaviour. Such red team and appliance can build a sophisticated 'pattern of life'—that understands what represents normality for every person, device, entity, email activity, and network activity in the system being protected by the cyber threat defense system. For example, the analyzer module may rank supported candidate cyber threat hypotheses by a combo of likelihood that this candidate cyber threat hypothesis is supported and a severity threat level of this incident type.

In addition, the correlation of the reporting and formatting modules may be configured to generate the report (or the graphs) with the identified critical devices connecting to the virtualized instance of the network under analysis that should have the priority to allocate security resources to them, along with one or more portions of the constructed graph. The formatting module may have an autonomous email-report composer that cooperates with the various AI models and modules of the AI based cyber security system as well as at least a set of one or more libraries of sets of contextual text, objects, and visual representations to populate on templates of pages in the email threat report based on any of the training and/or simulated attacking scenarios observed. The autonomous email-report composer can compose an email threat report on cyber threats that is composed in a human-readable format with natural language prose, terminology, and level of detail on the cyber threats aimed at a target audience being able to understand the terminology and the detail. Such modules and AI models may cooperate with the autonomous email-report composer to indicate in the email threat report, for example, an email attacks purpose and/or targeted group (such as members of the finance team, or high-level employees).

The formatting module may format, present a rank for, and output the current email threat report, from a template of a plurality of report templates, that is outputted for a human users consumption in a medium of, any of 1) a printable report, 2) presented digitally on a user interface, 3) in a machine readable format for further use in machine-learning reinforcement and refinement, and 4) any combination of the three. The system may use at least three separate machine learning models or any particular number of separate AI machine learning models. For example, a machine learning model may be trained on specific aspects of the normal pattern of life for entities in the system, such as devices, users, email/network traffic flow, outputs from one or more cyber security analysis tools analysing the system, etc. One or more machine learning models may also be trained on characteristics and aspects of all manner of types of cyber threats. One or more machine learning models may also be trained on composing email threat reports.

The various modules cooperate with each other, the AI models, and the data store to carry out the operations discussed above with regard to the AI based cyber security system. Such modules may cooperate to improve the analysis of the how vulnerable the organization is based on any of the observed (or trained/simulated/pentested) unusual events are to that specific organization and thus improve the formalized report generation with specific vulnerabilities and the extend of those vulnerabilities with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report. Note that, one or more processing units are configured to execute software instructions associated with the AI based cyber security system and any of its cooperating modules in that depicted system. Also note, that one or more non-transitory storage mediums are configured to store at least software associated with the AI adversary red team importance node module/AI based cyber security system, the other modules, and the AI models and classifiers.

The AI based cyber threat security/defense self-learning platform may use machine-learning technology with the importance node module. The machine-learning technology, using advanced mathematics, may detect previously unidentified threats, without rules, and automatically defend networks. Note, todays attacks may be of such severity and speed that a human response may not happen quickly enough. Thanks to these self-learning advances, it is now possible for a machine to uncover emerging threats and deploy appropriate, real-time responses to fight back against the most serious cyber threats.

This AI cyber security system with the importance node module may therefore be built and trained to have a sophisticated 'pattern of life'—that understands what represents normality for every person, device, and network activity associated with any of the users and/or entities in such system being protected by such AI based cyber security system.

The AI cyber security system with the importance node module may have the ability to self-learn and detect normality in order to spot true anomalies, allowing organizations of all sizes to understand any unusual behaviors of users, machines, tokens (or symbols, process chains, etc.), and so on, observed within any respective and discrete host device(s) and network(s) at both an individual and group level. Monitoring behaviors, rather than using predefined descriptive objects and/or signatures, means that more attacks may be spotted ahead of time and extremely subtle indicators of wrongdoing may be detected. Unlike traditional legacy defenses, a specific attack type or new malware does not have to have been seen first before it may be detected. A behavioral defense approach mathematically models both machine and human activity behaviorally, at and after the point of compromise, in order to predict and catch todays increasingly sophisticated cyber-attack vectors. It is thus possible to computationally establish what is normal, in order to then detect what is abnormal.

This AI cyber security system with the importance node module may thus be capable of making value judgments and carrying out higher value, more thoughtful tasks. Machine learning requires complex algorithms to be devised and an overarching framework to interpret the results produced. However, when applied correctly these approaches may facilitate machines to make logical, probability-based decisions and undertake thoughtful tasks.

Advanced machine-learning is at the forefront of the fight against automated and human-driven cyber-threats, overcoming the limitations of rules and signature-based approaches: (i) The machine-learning learns what is normal within a network—it does not depend upon knowledge of previous attacks. (ii) The machine-learning thrives on the scale, complexity and diversity of modern businesses, where every device and person is slightly different. (iii) The machine-learning turns the innovation of attackers against them—any unusual activity is visible. (iv) The machine-learning constantly revisits assumptions about behavior, using probabilistic mathematics. (v) The machine-learning is always up to date and not reliant on human input.

Utilizing machine-learning in cyber security technology is difficult, but when correctly implemented it is extremely powerful. The machine-learning means that previously unidentified threats may be detected, even when their manifestations fail to trigger any rule set or signature. Instead, machine-learning allows the system to analyze large sets of data and learn a 'pattern of life' for what it sees. Machine learning may approximate some human capabilities to machines, such as: (i) thought: it uses past information and insights to form its judgments; (ii) real time: the system processes information as it goes; and (iii) self-improving: the models machine-learning understanding is constantly being challenged and adapted, based on new information. New unsupervised machine-learning therefore allows computers to recognize evolving threats, without prior warning or supervision.

Note that, in other embodiments, one or more other detectors and data analysis process may be employed as detailed below, without limitations.

Unsupervised Machine Learning

Unsupervised learning works things out without pre-defined labels. In the case of sorting the series of different animals, the system analyzes the information and works out the different classes of animals. This allows the system to handle the unexpected and embrace uncertainty. The system does not always know what it is looking for, but may independently classify data and detect compelling patterns.

The cyber threat defense systems unsupervised machine learning methods do not require training data with pre-defined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense systems unsupervised machine learning on cyber security is transformative: (i) Threats from within, which would otherwise go undetected, may be spotted, highlighted, contextually prioritized and isolated using these algorithms. (ii) The application of machine learning has the potential to provide total network visibility and far greater detection levels, ensuring that networks have an internal defense mechanism. (iii) Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense systems machine learning algorithms and approaches is as follows.

The cyber threat defense systems probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense systems approach accounts for the inevitable ambiguities that exist in data and distinguishes between the subtly differing levels of evidence that different pieces of data may contain. Instead of generating the simple binary outputs 'malicious' or 'benign,' the cyber threat defense systems mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include at least one or more of: server access; data access; timings of events; credential use; DNS requests; and/or any other similar parameters. Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices. At a glance, clustering: (i) Analyzes behavior in the context of other similar devices on the network; (ii) Algorithms identify naturally occurring groupings of devices—impossible to do manually; and (iii) Simultaneously runs a number of different clustering methods to inform the models.

Network Topology

Any cyber threat detection system must also recognize that a network is far more than the sum of its individual parts, with much of its meaning contained in the relationships among its different entities, and that complex threats may often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a networks 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output may contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that may be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense systems mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense systems innovative approach to cyber security has pioneered the use of Bayesian methods for tracking changing device behaviors and computer network structures. The core of the cyber threat defense systems mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks may be spotted against the background understanding of what represents normality within a network. No pre-definitions are needed, which allows for the best possible insight and defense against todays threats. On top of the detection capability, the cyber threat defense system may create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense systems technology may become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within. As such, the threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output may contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The various methods described above may be implemented by a computer program product. The computer program product may include computer code arranged to instruct a computer to perform the functions of one or more of the various methods described above. The computer program and/or the code for performing such methods may be provided to an AI based cyber security system, such as a computer, on a computer readable medium or computer program product. For the computer program product, a transitory computer readable medium may include radio or other carrier waves.

An AI based cyber security system such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices may communicate with each other in a network environment. The network environment has a communications network. The network may include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system may communicate with the server(s). The client computing system may include, for example, the software application or the hardware-based system in which the client computing system may be able to exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud users cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be configured to utilize a protocol, such as Hypertext Transfer Protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access is configured to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system may include a server engine, a web page management component, a content management component, and a database management component. The server engine may perform basic processing and operating-system level tasks. The web page management component may handle creation and display, or routing of web pages or screens associated with receiving and providing digital content and digital advertisements. Users (e.g., cloud users) may access one or more of the server computing systems by means of a Uniform Resource Locator ("URL") associated therewith. The content management component may handle most of the functions in the embodiments described herein. The database management component may include storage and retrieval tasks with respect to the database, queries to the database, and storage of data.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any Hypertext Markup Language ("HTML") or Wireless Access Protocol ("WAP") enabled client computing system or any equivalent thereof. The client computing system may host a browser and/or a specific application to interact with the server computing system. Each application has a code scripted to perform the functions that the software component is configured to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

Figure 12:
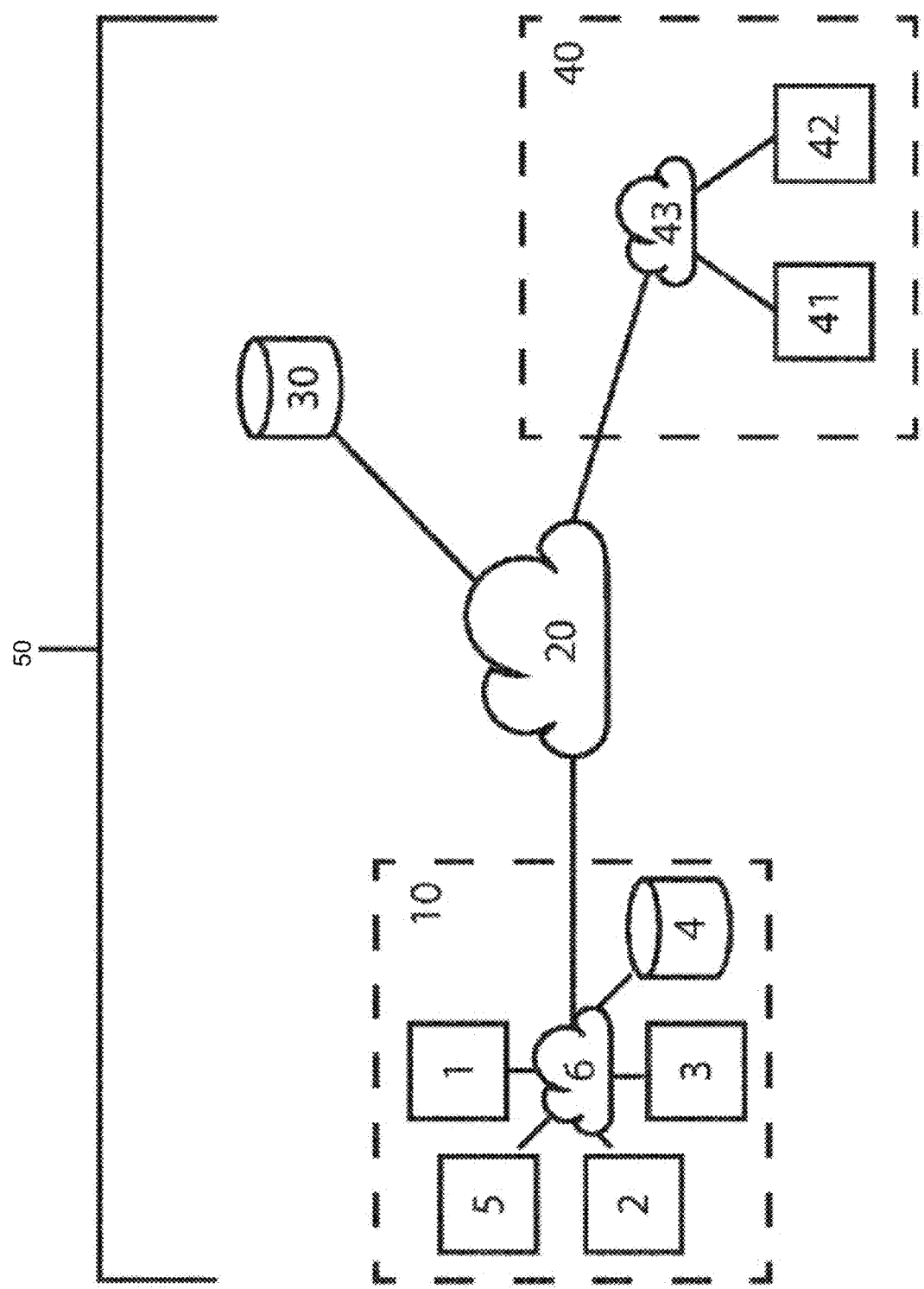
FIG. 12 illustrates a block diagram of a graph depicting one or more events and alerts triggered by any detected unusual email and network connectivity and behaviour patterns, in accordance with an embodiment of the disclosure.

FIG. 12 illustrates an example Artificial Intelligence based cyber security system using an importance node module 104 to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation.

The cyber security appliance 100 is built to deal with the fact that todays attackers are getting stealthier and an attacker/malicious agent may be 'hiding' in a system to ensure that they avoid raising suspicion in an end user, such as by slowing their machine down.

The cyber security appliance 100 builds a sophisticated 'pattern of life'—that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliances 100 AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method and system are arranged to be performed by one or more processing components with any portions of software stored in an executable format on a computer readable medium. Thus, any portions of the method, AI based cyber security system and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an AI based cyber security system, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

Figure 13:
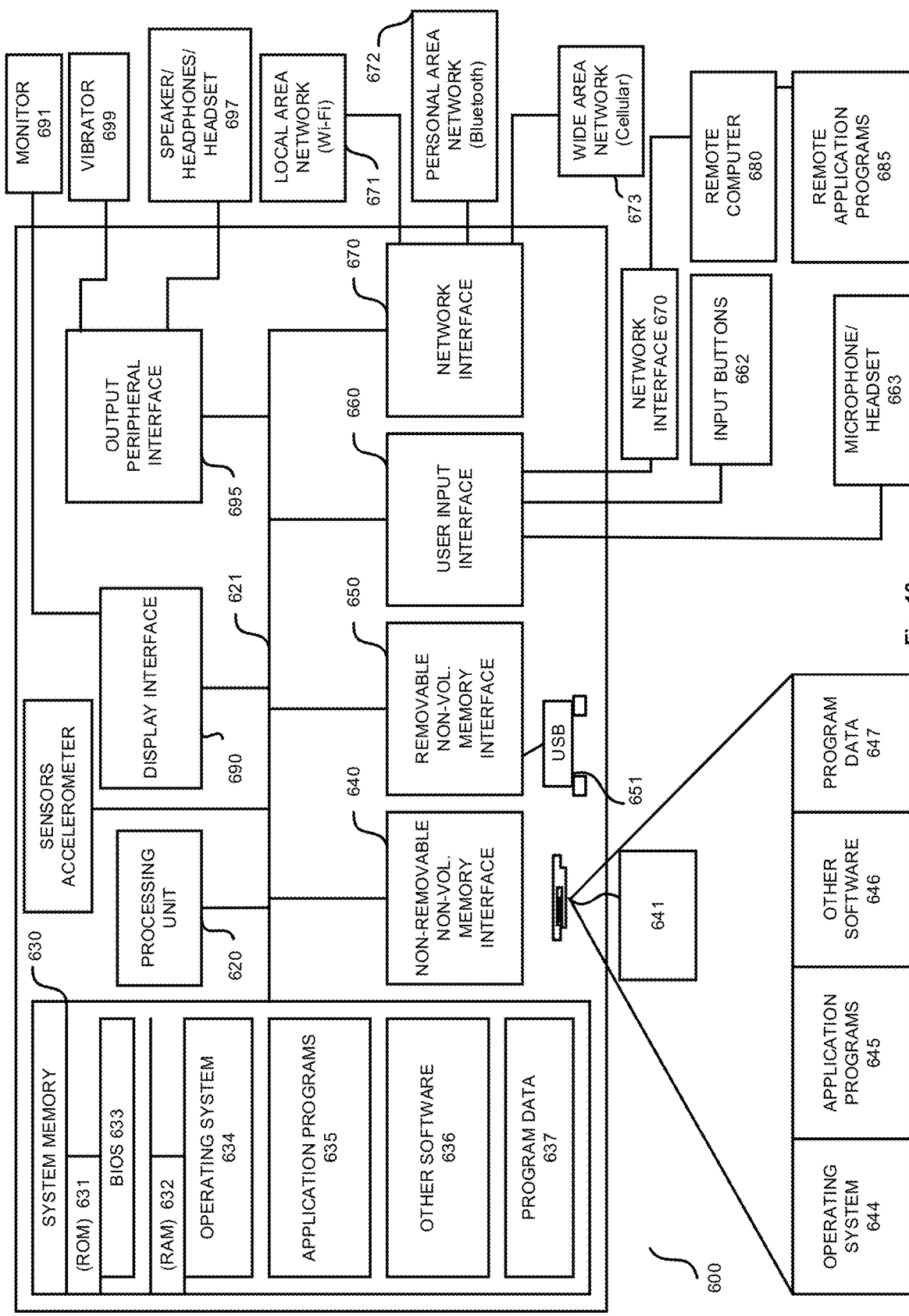
FIG. 13 illustrates an example AI based cyber security system using a cyber threat analyst module to protect an example network, in accordance with an embodiment of the disclosure.

FIG. 13 illustrates a block diagram of an embodiment of one or more computing devices that can be a part of the AI based cyber security system for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer systems registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
   an importance node module configured to compute, via a mathematical function and use of one or more graphs, an importance of a network node in the one or more graphs based on at least two or more factors that at least include a hierarchy of a user in an organization, a job title of the user in the organization, aggregated account privileges from multiple different network domains for the user, and a level of shared resource access for the user, where the importance node module is further configured to supply the one or more graphs as input into an attack path modeling component, where network nodes in a network include both network devices as well as user accounts,
   where the attack path modeling component is configured to i) understand the importance of a particular network node in the network compared to other network nodes in the network, and ii) determine key pathways within the network and associated vulnerable network nodes in the network that a cyber-attack would use during the cyber-attack, via a modeling of the cyber-attack with at least one of 1) a cyber threat attack simulator and 2) a clone network created in a virtual machine environment of the network under analysis, where the attack path modeling component is configured to understand the importance of the network nodes in the network compared to the other network nodes in the network based on the supplied graph input from the importance node module;
   where the importance node module and the attack path modeling component are configured to cooperate to analyze the importance of the network nodes in the network compared to other network nodes in the network, and the key pathways within the network and the vulnerable network nodes in the network that the cyber-attack would use during the cyber-attack in order to provide an intelligent prioritization of a remediation action to remediate the cyber-attack for a first network node from the network protected by an Artificial Intelligence (AI) based cyber security system;
   a remediation suggester module configured to cooperate with the attack path modeling component to analyze results of the modeling the cyber-attack occurrence for each node in the network and suggest how to perform the intelligent prioritization of a remediation action on the first network node based upon at least an importance of the first network node compared to the other network nodes in at least one of a report and an autonomous remediation action initiated by the remediation suggester module to mitigate against the cyber-attack;
   one or more processing units configured to execute software instructions associated with the importance node module, the attack path modeling component, and the remediation suggester module; and
   one or more non-transitory storage mediums configured to store at least software associated with the importance node module, the attack path modeling component, and the remediation suggester module.

2. The apparatus of claim 1, further comprising
   a graph theory module configured to cooperate with the importance node module to utilize a graph theory to derive multiple domain, risk-prioritized attack paths within the network for cyber-attack path modelling, where the network is a multiple domain network that includes at least two of a cloud network, an information technology network, and an email network, in order to assist in the intelligent prioritization of the remediation action initiated by the remediation suggester module to mitigate against the cyber-attack.

3. The apparatus of claim 1, wherein the attack path modeling component is further configured to utilize artificial intelligence models to model and the cyber threat attack simulator to simulate the cyber-attack occurrence and to determine and use a user's presence in a simulated cyber-attack analysis, where the user's presence includes at least the importance of the user.

4. The apparatus of claim 3, where the attack path modeling component and the importance node module are further configured to use a decay algorithm to decide what nodes in the network are of most importance to detect key devices or key users.

5. The apparatus of claim 2, where the graph theory module is configured to use an active directory that uses an unweighted directed graph.

6. The apparatus of claim 1, further comprising
a reconciliatory module configured to reconcile different accounts associated with a user in the network into one entity, where each of the different accounts is associated with a corresponding risk, where the reconciliatory module is further configured to compute a device importance for each network device based at least in part on an interactivity of the network device including data received by a first network device, data sent from the first network device, a level of sensitivity of the data accessible within the first network device.

7. The apparatus of claim 6, where the reconciliatory module is configured to compute an overall importance for each node in the network based on each of the different accounts associated with the user and each device importance of each network device associated with that node.

8. The apparatus of claim 1, where a graph module is configured to create a graph of nodes that a user in the network i) connects to, ii) move to, and iii) user's network device connects to.

9. The apparatus of claim 1, where the one or more graphs include at least a subset of a basic undirected graphs, a directed weighted graph, and an unweighted directed graphs from information pulled from domains based on factors that at least include the hierarchy of the user in the organization, the job title of the user in the organization, the aggregated account privileges from the multiple different network domains for the user, and the level of shared resource access for the user.

10. A method for countering a cyber-attack, the method comprising:
configuring an importance node module to compute, via a mathematical function and use of one or more graphs, an importance of a network node in the one or more graphs based on at least two or more factors that at least include a hierarchy of a user in an organization, a job title of the user in the organization, aggregated account privileges from multiple different network domains for the user, and a level of shared resource access for the user, where the importance node module is further configured to supply the one or more graphs as input into an attack path modeling component, where network nodes in a network include both network devices as well as user accounts,
configuring the attack path modeling component to i) understand the importance of a particular network node in the network compared to other network nodes in the network, and ii) determine key pathways within the network and associated vulnerable network nodes in the network that a cyber-attack would use during the cyber-attack, via a modeling of the cyber-attack with at least one of 1) a cyber threat attack simulator and 2) a clone network created in a virtual machine environment of the network under analysis, where the attack path modeling component is configured to understand the importance of the network nodes in the network compared to the other network nodes in the network based on the supplied graph input from the importance node module;
configuring the importance node module and the attack path modeling component to cooperate to analyze the importance of the network nodes in the network compared to other network nodes in the network, and the key pathways within the network and the vulnerable network nodes in the network that the cyber-attack would use during the cyber-attack in order to provide an intelligent prioritization of a remediation action to remediate the cyber-attack for a first network node from the network protected by an Artificial Intelligence (AI) based cyber security system;
configuring a remediation suggester module to cooperate with the attack path modeling component to analyze results of the modeling the cyber-attack occurrence for each node in the network and suggest how to perform the intelligent prioritization of a remediation action on the first network node based upon at least an importance of the first network node compared to the other network nodes in at least one of a report and an autonomous remediation action initiated by the remediation suggester module to mitigate against the cyber-attack;
configuring one or more processing units to execute software instructions associated with the importance node module, the attack path modeling component, and the remediation suggester module; and
configuring one or more non-transitory storage mediums to store at least software associated with the importance node module, the attack path modeling component, and the remediation suggester module.

11. The method of claim 10, further comprising
configuring a graph theory module configured to cooperate with the importance node module to utilize a graph theory to derive multiple domain, risk-prioritized attack paths within the network for cyber-attack path modelling, where the network is a multiple domain network that includes at least two of a cloud network, an information technology network, and an email network, in order to assist in the intelligent prioritization of the remediation action initiated by the remediation suggester module to mitigate against the cyber-attack.

12. The method of claim 10, further comprising
configuring the attack path modeling component to utilize artificial intelligence models to model and the cyber threat attack simulator to simulate the cyber-attack occurrence and to determine and use a user's presence in a simulated cyber-attack analysis, where the user's presence includes at least the importance of the user.

13. The method of claim 12, further comprising
configuring the attack path modeling component and the importance node module to use a decay algorithm to decide what nodes in the network are of most importance to detect key devices or key users.

14. The method of claim 12, further comprising
configuring a graph theory module to use an active directory that uses an unweighted directed graph.

15. The method of claim 10, further comprising
configuring a reconciliatory module to reconcile different accounts associated with a user in the network into one entity, where each of the different accounts is associated with a corresponding risk.

16. The method of claim 10, further comprising
configuring a reconciliatory module to compute an overall importance for each node in the network based on each different account associated with the user and each device importance of each network device associated with that node.

17. The method of claim 11, further comprising
configuring a graph theory module to create a graph of the nodes that a user in the network i) connects to, ii) moves to, or iii) user's device connects to.

18. The method of claim 10, where the one or more graphs include at least a subset of a basic undirected graphs, a directed weighted graph, and an unweighted directed graphs from information pulled from domains based on factors that at least include the hierarchy of the user in the organization, the job title of the user in the organization, the aggregated account privileges from the multiple different network domains for the user, and the level of shared resource access for the user.

19. The method of claim 15, further comprising configuring the reconciliatory module to compute a device importance for each network device based at least in part on an interactivity of the network device including data received by a first network device, data sent from the first network device, a level of sensitivity of the data accessible within the first network device.

20. A non-transitory computer readable medium in an AI based cyber security system, comprising one or more computer readable codes operable, when executed by one or more processors, to instruct an importance node module residing on the AI based cyber security system to perform the method of claim 10.

* * * * *